United States Patent
Qi et al.

(10) Patent No.: US 10,972,817 B2
(45) Date of Patent: Apr. 6, 2021

(54) TOPOLOGY PROCESSING METHOD, APPARATUS, AND SYSTEM

(71) Applicant: HUAWEI TECHNOLOGIES CO., LTD., Guangdong (CN)

(72) Inventors: Biao Qi, Wuhan (CN); Jun Zhang, Dongguan (CN); Wei Wang, Dongguan (CN); Wei Xiong, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/801,529

(22) Filed: Feb. 26, 2020

(65) Prior Publication Data

US 2020/0275174 A1 Aug. 27, 2020

Related U.S. Application Data

(63) Continuation of application No. PCT/CN2019/076091, filed on Feb. 25, 2019.

(51) Int. Cl.
*H04Q 11/00* (2006.01)
*G02B 6/44* (2006.01)

(52) U.S. Cl.
CPC ....... *H04Q 11/0067* (2013.01); *G02B 6/4452* (2013.01); *H04Q 11/0071* (2013.01);
(Continued)

(58) Field of Classification Search
CPC ........... H04Q 11/0067; H04Q 11/0071; H04Q 2011/0079; H04Q 2011/009; G02B 6/4452
(Continued)

(56) References Cited

U.S. PATENT DOCUMENTS 7,894,362 B2 * 2/2011 Effenberger ............ H04L 12/66
370/252
9,870,773 B2 1/2018 German et al.
(Continued)

FOREIGN PATENT DOCUMENTS

CN 101388725 A 3/2009
CN 102034278 A 4/2011
(Continued)

OTHER PUBLICATIONS

Office Action issued in Chinese Application No. 201980001338.X dated Apr. 22, 2020, 24 pages (with English translation).
(Continued)

*Primary Examiner* — Dalzid E Singh
(74) *Attorney, Agent, or Firm* — Fish & Richardson P.C.

(57) ABSTRACT

A topology processing method, apparatus, and system are provided. The topology processing method includes: obtaining, by a topology processing apparatus, a first onsite image collected from an optical distribution network ODN, where the first onsite image includes at least an imaging of a first port of a first ODN device, the first port is connected to a first cable, a first identification area used to identify the first cable is disposed on the first cable, and the first onsite image further includes at least an imaging of the first identification area on the first cable; and identifying, by the topology processing apparatus, the first cable based on the first identification area on the first onsite image, and identifying, based on the first onsite image, the first port connected to the first cable; and generating a first correspondence between the first ODN device, the first port, and the first cable.

18 Claims, 18 Drawing Sheets

(52) U.S. Cl.
    CPC .................. *H04Q 2011/009* (2013.01); *H04Q 2011/0079* (2013.01)

(58) Field of Classification Search
    USPC .......................................................... 398/58
    See application file for complete search history.

(56) References Cited

U.S. PATENT DOCUMENTS

| | | | |
|---|---|---|---|
| 2013/0223684 | A1 | 8/2013 | Townend et al. |
| 2015/0060539 | A1* | 3/2015 | Thompson ........... G02B 6/3895 235/375 |
| 2016/0132532 | A1 | 5/2016 | German et al. |
| 2016/0134484 | A1 | 5/2016 | Tanaka |
| 2017/0018274 | A1 | 1/2017 | German et al. |
| 2017/0124415 | A1 | 5/2017 | Choi et al. |

FOREIGN PATENT DOCUMENTS

| | | | |
|---|---|---|---|
| CN | 102035599 | A | 4/2011 |
| CN | 201974640 | U | 9/2011 |
| CN | 102739310 | A | 10/2012 |
| CN | 202486802 | U | 10/2012 |
| CN | 202978987 | U | 6/2013 |
| CN | 204087347 | U | 1/2015 |
| CN | 204217038 | U | 3/2015 |
| CN | 205263910 | U | 5/2016 |
| CN | 205385566 | U | 7/2016 |
| CN | 107465528 | A | 12/2017 |
| CN | 107890351 | A | 4/2018 |
| CN | 207337495 | U | 5/2018 |
| CN | 108234024 | A | 6/2018 |
| CN | 108389313 | A | 8/2018 |
| CN | 208092756 | U | 11/2018 |
| EP | 0852356 | A1 | 7/1998 |
| EP | 3218967 | A4 | 5/2018 |
| EP | 3089071 | B1 | 11/2019 |
| JP | H0823399 | A | 1/1996 |
| JP | 2010118070 | A | 5/2010 |
| WO | WO-2017206535 | A1 * | 12/2017 |

OTHER PUBLICATIONS

PCT International Search Report and Written Opinion issued in International Application No. PCT/CN2019/076091 dated May 29, 2019, 10 pages.

Extended European Search Report issued in European Application No. 19853267.3 dated Dec. 21, 2020, 8 pages.

* cited by examiner

Normal case

After optical cable bending occurs

TOPOLOGY PROCESSING METHOD, APPARATUS, AND SYSTEM

CROSS-REFERENCE TO RELATED APPLICATION

This application is a continuation of International Patent Application No. PCT/CN2019/076091, filed on Feb. 25, 2019, the disclosure of which is hereby incorporated by reference in its entirety.

TECHNICAL FIELD

Embodiments of this application relate to the communications field, and in particular, to a topology processing method, apparatus, and system.

BACKGROUND

With development of optical communications technologies, a passive optical network (PON) technology is widely applied to an access network. An optical distribution network (ODN) device is a fiber to the home (FTTH) optical cable network device based on a PON device. The ODN device mainly provides an optical transmission channel between an optical line terminal (OLT) and an optical network terminal (ONT).

FTTH is a way of development of an access network. FTTH can provide a larger bandwidth, lower requirements on an environment condition, power supply, and the like, and also simplify maintenance requirements. In FTTH, a PON technology is mainly used, an ODN device may split data of one OLT to dozens of or tens of or hundreds of ONTs by using an ODN device. A user end needs to perform distribution scheduling and maintenance management on massive optical fiber lines. Managing and maintaining an ODN device is of great importance for all carriers. In a current optical communications network, a large amount of optical fiber network data is inaccurate. For example, some optical fiber resources are displayed as idle and available resources on a management system while these resources are actually occupied; or some resources are displayed as occupied resources on the management system while the resources are actually idle; or data of some optical resources is incorrect or even there is no data about the resources. For example, a port of a specific OLT to which ODN device is connected cannot be determined, or whether there is still a service at a port of an OLT cannot be determined. These problems cause a waste of a large quantity of resources, and also make management of an ODN device difficult.

In a current optical communications network, a port is identified and a route is managed mainly by attaching a paper label to a connector of each optical fiber. All devices on a network are recorded by using paper labels. For example, the paper labels are used to record related attributes such as names, identifiers, and functions of various devices. Then, the paper labels are fastened to the ODN devices, to be used as identifiers for identity identification of the ODN devices, so that a maintenance engineer can accurately identify identities of different ODN devices in subsequent maintenance and repair work, thereby pertinently implementing maintenance and repair work.

The inventor of this application finds that the prior art has at least the following disadvantages: Manual recording by using paper labels brings an enormous amount of workload of manual operations, and causes high labor costs. In addition, it is very difficult to quickly distinguish between different optical fibers and ports of ODN devices through manual recording, causing a relatively high error rate, data update delay, and low operation and maintenance efficiency. Moreover, a paper label is prone to damage, and becomes blurred over time, making management and maintenance of the ODN devices difficult.

It can be learned from the foregoing analysis that, management of an ODN device is inefficient and costly in the prior art.

SUMMARY

Embodiments of this application provide a topology processing method, apparatus, and system, to improve management efficiency of an ODN device and reduce management costs.

To resolve the foregoing technical problem, the embodiments of this application provide the following technical solutions.

According to a first aspect, an embodiment of this application provides a topology processing method, including: obtaining, by a topology processing apparatus, a first onsite image collected from an optical distribution network ODN, where the first onsite image includes at least an imaging of a first port of a first ODN device, the first port is connected to a first cable, a first identification area used to identify the first cable is disposed on the first cable, and the first onsite image further includes at least an imaging of the first identification area on the first cable; and identifying the first cable based on the first identification area on the first onsite image, and identifying, based on the first onsite image, the first port connected to the first cable; and generating, by the topology processing apparatus, a first correspondence between the first ODN device, the first port, and the first cable.

In this embodiment of this application, the topology processing apparatus first obtains the first onsite image collected from the ODN, where the first onsite image includes at least the imaging of the first port of the first ODN device, the first port is connected to a first cable, a first identification area used to identify the first cable is disposed on the first cable, and the first onsite image further includes at least the imaging of the first identification area of the first cable; the topology processing apparatus identifies the first cable based on the first identification area on the first onsite image, and identifies, based on the first onsite image, the first port connected to the first cable; and finally, the topology processing apparatus generates the first correspondence between the first ODN device, the first port, and the first cable. In this embodiment of this application, the first cable may be identified from the first onsite image by analyzing the first onsite image obtained through ODN onsite collection, and that the first cable is connected to the first port of the first ODN device may also be identified. The correspondence between the first ODN device, the first port, and the first cable may be further generated based on the foregoing image identification result. Therefore, in comparison with the prior art, in this embodiment of this application, automatic sorting and reviewing of resources on an ODN is implemented without recording by using paper labels, so that resources in the optical distribution network are sorted simply, fast, automatically, and reliably, thereby reducing human resources, improving management efficiency of the ODN device, and reducing management costs.

In a possible implementation of the first aspect, a device identification area is disposed on the first ODN device, the device identification area is used to identify the first ODN device, and the first onsite image further includes an imaging of the device identification area; and the method further includes: identifying, by the topology processing apparatus, the first ODN device based on the device identification area on the first onsite image. The first onsite image obtained by the topology processing apparatus includes the device identification area. For example, the first onsite image further includes the imaging of the device identification area, and the first ODN device may be determined by identifying the imaging of the device identification area. It is not limited that in some other embodiments of this application, in addition to identifying the first ODN device by using the device identification area, the topology processing apparatus may further obtain an identifier that is of the first ODN device and that is entered by the user, and may identify the first ODN device by using the identifier.

In a possible implementation of the first aspect, the device identification area is used to indicate at least one of the following information; the identifier of the first ODN device, a port arrangement manner of the first ODN device, a type of the first ODN device, a serial number of the first ODN device, or a production date of the first ODN device. The identifier of the first ODN device may be an identifier different from that of another ODN device. For example, the identifier may be an identification code. The port arrangement manner of the first ODN device is a manner of port arrangement on an end face of the first ODN device. For example, the port arrangement manner of the ODN device means that each port of the ODN device can be identified through photographing by an onsite terminal at an angle, without being completely blocked. The port arrangement manner includes but is not limited to a single-row port design, a dual-row port design, and a W-shaped port design. The type of the first ODN device refers to information used to distinguish between different types of ODN device. For example, different types of information may be set for different types of ODN devices. The serial number of the first ODN device may be used to distinguish between the first ODN device and another ODN device. The production date of the first ODN device refers to a string of numbers formed by date values, and the production date of the first ODN device may also be used to distinguish between the first ODN device and another ODN device. It should be noted that, a specific implementation form of the device identification area in this embodiment of this application may not be limited to one or more of the foregoing examples.

In a possible implementation of the first aspect, the method further includes: obtaining, by the topology processing apparatus, a second onsite image, where the second onsite image includes at least an imaging of a second port of a first optical network terminal ONT, and the second port is connected to the first cable; identifying, by the topology processing apparatus based on the second onsite image, the second port connected to the first cable; and generating, by the topology processing apparatus, a second correspondence between the first ONT, the second port, and the first cable. In this embodiment of this application, the topology processing apparatus obtains the second onsite image. For example, the topology processing apparatus is an onsite terminal, and the onsite terminal may further collect the second onsite image of the first ONT. For another example, the topology processing apparatus is a network management server, the onsite terminal may further collect the second onsite image of the first ONT, then the onsite terminal sends the second onsite image to the network management server, and the network management server may obtain the second onsite image from the onsite terminal. The first ONT has at least one port. For example, the first ONT may include a second port. When collecting an onsite image of the first ONT, the onsite terminal may obtain an imaging of the second port of the first ONT. The second port of the first ONT is connected to a cable. For example, the second port may be connected to the first cable, and in this case, the first ODN device is connected to the first ONT through the first cable.

In a possible implementation of the first aspect, the method further includes: generating, by the topology processing apparatus, a first physical topology based on the first correspondence and the second correspondence. The topology processing apparatus determines, based on the first correspondence, that the first ODN device, the first port, and the first cable are corresponding to each other, and determines, based on the second correspondence, that the first ONT, the second port, and the first cable are corresponding to each other. Therefore, the topology processing apparatus may determine a physical connection relationship between the first ODN device, the first ONT, and the first cable based on the first correspondence and the second correspondence. Therefore, the topology processing apparatus may generate the first physical topology, and the first physical topology includes specific devices and a physical connection relationship between devices.

In a possible implementation of the first aspect, the topology processing apparatus is an onsite terminal, and the method further includes: sending, by the topology processing apparatus, the first physical topology to a network management server. The network management server may receive the first physical topology from the onsite terminal, and determine the physical connection relationship between the first ODN device, the first ONT and the first cable by using the first physical topology.

In a possible implementation of the first aspect, the topology processing apparatus is a network management server, and the obtaining, by a topology processing apparatus, a first onsite image collected from an optical distribution network ODN includes: receiving, by the topology processing apparatus, the first onsite image sent by an onsite terminal, where the first onsite image is obtained by the onsite terminal by collecting an onsite image of the ODN. After the onsite terminal obtains the first onsite image by collecting the onsite image of the ODN, the onsite terminal may send the first onsite image to the network management server, so that the network management server may receive the first onsite image from the onsite terminal.

In a possible implementation of the first aspect, the topology processing apparatus is an onsite terminal, and the method further includes: sending, by the topology processing apparatus, the first correspondence to a network management server. The onsite terminal may communicate with the network management server. After the onsite terminal generates the first correspondence, the onsite terminal sends the first correspondence to the network management server, so that the network management server may receive the first correspondence, and may determine, based on the first correspondence, that the first ODN device, the first port, and the first cable are corresponding to each other.

In a possible implementation of the first aspect, the method further includes: obtaining, by the topology processing apparatus, a third onsite image collected from the ODN, where the third onsite image includes at least an imaging of a third port of a second ODN device, and the third port is connected to the first cable; identifying, by the topology processing apparatus based on the third onsite image, the third port connected to the first cable; and generating, by the topology processing apparatus, a third correspondence between the second ODN device, the third port, and the first cable. If the first ODN device and the second ODN device are cascaded ODN devices, the onsite terminal may obtain the third onsite image by collecting an onsite image of the second ODN device. After the topology processing apparatus identifies the first cable and identifies that the first cable is connected to the third port of the second ODN device, the topology processing apparatus may generate the third correspondence between the second ODN device, the third port, and the first cable. For example, the third correspondence may include that the second ODN device is connected to the first cable through the third port.

In a possible implementation of the first aspect, the first onsite image further includes imagings of a plurality of ports of the first ODN device, and the identifying, based on the first onsite image, the first port connected to the first cable includes: identifying, by the topology processing apparatus, the first port based on a port arrangement manner observed by the plurality of ports and a relative position relationship between the first cable and a port. Each port number may be identified based on a sequence of ports of the first ODN device, and a specific cable connected to each port may be identified based on the first cable connected to each port. It is not limited that in some other embodiments of this application, the port number of the first ODN device may also be identified in another manner. For example, a second identification area may be disposed on a port of the ODN device, to identify a specific port number of a port corresponding to the second identification area.

In a possible implementation of the first aspect, the topology processing apparatus is a network management server, and the method further includes: periodically collecting, by the topology processing apparatus, first status information of the first ONT from the first physical topology; performing, by the topology processing apparatus, status change analysis on the first status information by using a preconfigured logical topology generation algorithm, and generating a first logical topology based on a status change analysis result, where the first logical topology includes a correspondence between the first ODN device, the first cable, and the first ONT; performing, by the topology processing apparatus, comparison analysis on the first physical topology and the first logical topology, and determining, based on a comparison analysis result, whether the first physical topology needs to be updated. In this embodiment of this application, after the topology processing apparatus generates the first logical topology, the topology processing apparatus performs comparison analysis on the first physical topology and the first logical topology, for example, compares whether the first physical topology and the first logical topology have different connection relationships, for example, that the first ODN device is connected to the first ONT is recorded in the first physical topology, but that the first ODN device is connected to the first ONT is not recorded in the first logical topology. Finally, the topology processing apparatus may determine, based on the comparison analysis result, whether the first physical topology needs to be updated. It can be learned from the topology processing method provided in this embodiment of this application that, the topology processing apparatus automatically matches, sorts, and reviews a to-be-sorted logical topology, thereby automatically sorting and reviewing resources in the optical fiber distribution network, and improving reliability of sorting resources in the optical fiber distribution network. In this way, resources on the optical network are sorted simply, quickly, automatically, and reliably, human resource investment is reduced, check efficiency is greatly improved, and check work of optical network resources is regularized.

In a possible implementation of the first aspect, the first status information includes performance data of the first ONT or alarm data of the first ONT. The first status information includes various status parameters of a running status of the first ONT. For example, the first status information includes the performance data of the first ONT or the alarm data of the first ONT. The performance data of the first ONT may be an optical power of the first ONT a bit error rate of the first ONT, or other data. The alarm data of the first ONT may be alarm information sent by the first ONT, for example, alarm information sent when the first ONT is disconnected, or alarm information sent when the optical power of the first ONT exceeds a threshold.

In a possible implementation of the first aspect, the performing, by the topology processing apparatus, status change analysis on the first status information by using a preconfigured logical topology generation algorithm includes: obtaining, by the topology processing apparatus based on the first status information, a status change feature that is of the first ONT in a first time period; and performing, by the topology processing apparatus, similarity cluster analysis on the status change feature of the first ONT in the first time period. The topology processing apparatus analyzes the first status information of the first ONT, sets the first time period, and obtains the status change feature of the first ONT in the first time period, that is, may obtain a status change pattern of the first ONT. It should be noted that, in this embodiment of this application, the first ONT may be one or more ONTs of a specific type. The topology processing apparatus performs similarity cluster analysis on the status change feature of the first ONT in the first time period in a similarity cluster analysis manner. For example, ONTs that have a same variation in a same time period are classified as ONTs that are connected to a same ODN device, and a used method includes but is not limited to data feature change mining or cluster analysis. A level of the ODN device is identified, and a change of an ODN connection relationship is continuously monitored.

In a possible implementation of the first aspect, the determining, based on a comparison analysis result, whether the first physical topology needs to be updated includes: when the comparison analysis result is that the first physical topology and the first logical topology have different correspondences, sending, by the topology processing apparatus, an onsite review instruction, and determining, based on an onsite review result, whether the first physical topology needs to be updated. The comparison analysis result is that the first physical topology and the first logical topology have different correspondences. For example, whether the first physical topology and the first logical topology have different connection relationships is compared. In this case, the topology processing apparatus sends the onsite review instruction, that is, the topology processing apparatus may send a warning message, and the topology processing apparatus generates a work order used for performing physical topology troubleshooting onsite. After receiving the work order, an implementation engineer goes to a site of the ODN device to conduct a survey, so as to feed back, according to an actual situation, whether the first physical topology needs to be updated. In this embodiment of this application, when the first physical topology and the first logical topology have different correspondences, the topology processing apparatus sends the onsite review instruction, so as to facilitate maintenance for an optical communications network, and improve network management efficiency.

In a possible implementation of the first aspect, the first ODN device includes at least one of the following devices: a fiber access terminal, a splitting and splicing closure, an access terminal box, or an optical distribution frame. It should be noted that the ODN device is not limited to the foregoing several types of devices, and the ODN device may be any node device on the ODN.

According to a second aspect, an embodiment of this application provides a topology processing apparatus, including: an image obtaining module, configured to obtain a first onsite image collected from an optical distribution network ODN, where the first onsite image includes at least an imaging of a first port of a first ODN device, the first port is connected to a first cable, a first identification area used to identify the first cable is disposed on the first cable, and the first onsite image further includes at least an imaging of the first identification area on the first cable; an image identification module, configured to identify the first cable based on the first identification area on the first onsite image, and identify, based on the first onsite image, the first port connected to the first cable; and a mapping module, configured to generate a first correspondence between the first ODN device, the first port, and the first cable.

In a possible implementation of the second aspect, a device identification area is disposed on the first ODN device, the device identification area is used to identify the first ODN device, and the first onsite image further includes an imaging of the device identification area; and the image identification module is further configured to identify the first ODN device based on the device identification area on the first onsite image.

In a possible implementation of the second aspect, the device identification area is used to indicate at least one of the following information: an identifier of the first ODN device, a port arrangement manner of the first ODN device, a type of the first ODN device, a serial number of the first ODN device, or a production date of the first ODN device.

In a possible implementation of the second aspect, the image obtaining module is further configured to obtain a second onsite image, where the second onsite image includes at least an imaging of a second port of a first optical network terminal ONT, and the second port is connected to the first cable; and the image identification module is further configured to identify, based on the second onsite image, the second port connected to the first cable; and the mapping module is further configured to generate a second correspondence between the first ONT, the second port, and the first cable.

In a possible implementation of the second aspect, the topology processing apparatus further includes a physical topology generation module, configured to generate a first physical topology based on the first correspondence and the second correspondence.

In a possible implementation of the second aspect, the topology processing apparatus is an onsite terminal, and the topology processing apparatus further includes a sending module, configured to send the first physical topology to a network management server.

In a possible implementation of the second aspect, the topology processing apparatus is a network management server, and the image obtaining module is configured to receive the first onsite image sent by an onsite terminal, where the first onsite image is obtained by the onsite terminal by collecting an onsite image of the ODN.

In a possible implementation of the second aspect, the topology processing apparatus is an onsite terminal, and the topology processing apparatus further includes a sending module, configured to send the first correspondence to a network management server.

In a possible implementation of the second aspect, the topology processing apparatus is a network management server, and the topology processing apparatus further includes: a status collection module, configured to periodically collect first status information of the first ONT from the first physical topology; a logical topology generation module, configured to perform status change analysis on the first status information by using a preconfigured logical topology generation algorithm, and generate a first logical topology based on a status change analysis result, where the first logical topology includes a correspondence between the first ODN device, the first cable, and the first ONT; and a topology analysis module, configured to compare the first physical topology with the first logical topology, and determine, based on a comparison analysis result, whether the first physical topology needs to be updated.

In the second aspect of this application, the modules of the topology processing apparatus may further perform steps described in the first aspect and the possible implementations. For details, refer to the foregoing descriptions in the first aspect and the possible implementations.

According to a third aspect, an embodiment of this application provides another topology processing apparatus. The topology processing apparatus includes a processor and a memory. The processor and the memory communicate with each other; the memory is configured to store an instruction; and the processor is configured to execute the instruction in the memory, and perform the method in any one of the first aspect or the possible implementations.

In the third aspect of this application, the processor of the topology processing apparatus may further perform steps described in the first aspect and the possible implementations. For details, refer to the foregoing descriptions in the first aspect and the possible implementations.

According to a fourth aspect, an embodiment of this application provides a topology processing system. The topology processing system includes an onsite terminal and a network management server. The onsite terminal is configured to obtain a first onsite image collected from an optical distribution network ODN, where the first onsite image includes at least an imaging of a first port of a first ODN device, and the first port is connected to a first cable, a first identification area used to identify the first cable is disposed on the first cable, and the first onsite image further includes at least an imaging of the first identification area on the first cable. The onsite terminal is further configured to send the first onsite image to the network management server. The network management server is configured to receive the first onsite image; identify the first cable based on the first identification area on the first onsite image, and identify, based on the first onsite image, the first port connected to the first cable; and generate a first correspondence between the first ODN device, the first port, and the first cable.

According to a fifth aspect, an embodiment of this application provides another topology processing system. The topology processing system includes an onsite terminal and a network management server. The onsite terminal is configured to obtain a first onsite image collected from an optical distribution network ODN, where the first onsite image includes at least an imaging of a first port of a first ODN device, and the first port is connected to a first cable, a first identification area used to identify the first cable is disposed on the first cable, and the first onsite image further includes at least an imaging of the first identification area on the first cable; identify the first cable based on the first identification area on the first onsite image, and identify, based on the first onsite image, the first port connected to the first cable; and generate a first correspondence between the first ODN device, the first port, and the first cable. The onsite terminal is further configured to send the first correspondence to the network management server. The network management server is configured to receive the first correspondence; and determine, based on the first correspondence, that the first ODN device, the first port, and the first cable are corresponding to each other.

According to a sixth aspect, an embodiment of this application provides a computer-readable storage medium. The computer-readable storage medium stores an instruction, and when the instruction is run on a computer, the computer is enabled to perform the method in the first aspect.

According to a seventh aspect, an embodiment of this application provides a computer program product including an instruction. When the instruction is run on a computer, the computer is enabled to perform the method in the first aspect.

According to an eighth aspect, an embodiment of this application provides a topology processing apparatus. The topology processing apparatus may include an onsite terminal, a network management server, a chip, or another entity. The topology processing apparatus includes a control apparatus and a memory. The memory is configured to store an instruction. The control apparatus is configured to execute the instruction in the memory, so that the topology processing apparatus is enabled to perform the method in any one of the first aspect or the possible implementations.

According to a ninth aspect, this application provides a chip system. The chip system includes a control apparatus, configured to support an onsite terminal or a network management server in implementing a function in the foregoing aspects, for example, sending or processing data and/or information in the foregoing methods. In a possible design, the chip system further includes a memory. The memory is configured to store a program instruction and data that are necessary for an onsite terminal or a network management server. The chip system may include a chip, or may include a chip and another discrete device.

DESCRIPTION OF EMBODIMENTS

Embodiments of this application provide a topology processing method, apparatus, and system, to improve management efficiency of an ODN device and reduce management costs.

Figure 1:
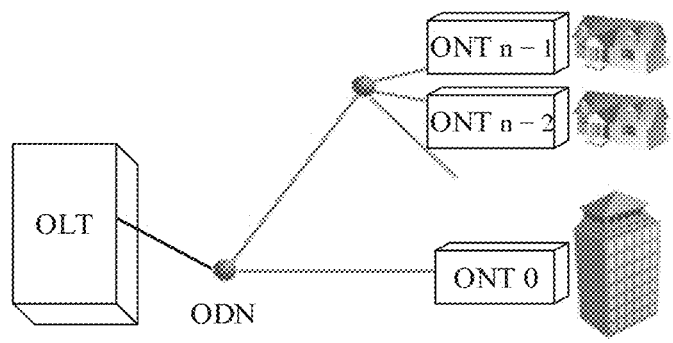
FIG. 1 is a schematic structural diagram of composition of an optical communications system according to an embodiment of this application.

Technical solutions in the embodiments of this application may be applied to various optical communications systems. As shown in FIG. 1, an optical communications system provided in the embodiments of this application may include an OLT, an ODN device, and n ONTs. In the embodiments of this application, the OLT is connected to the n ONTs by using the ODN device. For example, the n ONTs may be an ONT 0, . . . , an ONT n−2, and ONT n−1 that are shown in FIG. 1 The ODN device is a passive component, and the ODN device includes at least one of the following devices: a fiber access terminal (FAT), a splitting and splicing closure (SSC), an access terminal box (ATB), or an optical distribution frame (ODF). The optical distribution frame is configured to, for example, terminate and distribute feeder optical fibers at a central office end in an optical fiber communications system, so that optical fibers can be conveniently connected to each other, allocated, and scheduled. The fiber access terminal is located at a user access point of an optical access network for connecting a distribution optical cable to drop cables, and direct connections, branching, and protection of optical fibers. An optical splitter and the like may be disposed inside the fiber access terminal. The splitting and splicing closure may be an outdoor closure that can be installed in a manhole or in a hand hole. The splitting and splicing closure is mainly used at the access point of the optical access network, and is configured to connect and branch optical fibers and route drop cables from user terminals. The access terminal box is a passive device for connecting drop cables to an indoor ONT. The access terminal box is installed in a user's interior wall and provides an optical port for the indoor ONT. It should be noted that the ODN device is not limited to the foregoing types of devices, and the ODN device may be any node device on an ODN.

Figure 2:
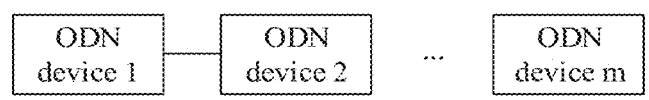
FIG. 2 is a schematic diagram of cascading a plurality of ODN devices according to an embodiment of this application.

The optical communications system provided in the embodiments of this application may include one level of ODN device, and in this case, the ODN in the optical communications system uses a level-1 optical splitting manner. There is only one level of ODN device between an OLT and an ONT in the level-1 optical splitting scenario. Alternatively, the optical communications system may include a plurality of levels of ODN devices, and in this case, the ODN uses a multiple-level optical splitting manner. FIG. 2 is a schematic diagram of cascading a plurality of ODN devices according to an embodiment of this application. For example, in a level-2 optical splitting manner, in a level-2 splitting scenario, there are a plurality of ODN devices between an OLT and an ONT, and these ODN devices are serially connected (also referred to as cascaded). For example, in an entire structure of the optical communications system, an OLT is connected to an ODN device 1, the ODN device 1 is connected to an ODN device 2, the ODN device 2 is further connected to an ODN device 3 until an ODN device m−1 is connected to an ODN device m, and finally the ODN device m is connected to the ONT.

Figure 3:
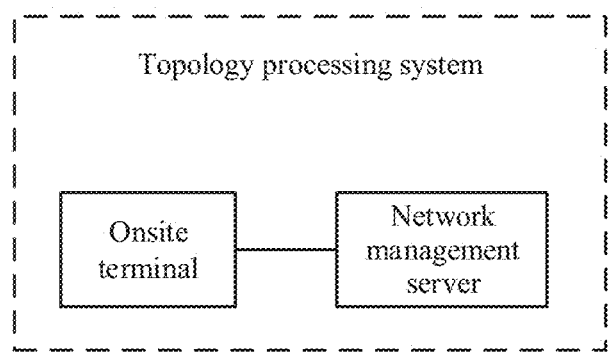
FIG. 3 is a schematic structural diagram of composition of a topology processing system according to an embodiment of this application.

To resolve a prior-art problem of manual recording by using paper labels, an embodiment of this application provides a topology processing system. A device included in the topology processing system is a topology processing device. Specifically, the topology processing device may perform a topology processing method provided in this embodiment of this application, and the topology processing method is described in detail in a following embodiment. The topology processing device provided in this embodiment of this application may be specifically an onsite terminal, or the topology processing device may be a network management server. FIG. 3 is a schematic structural diagram of composition of a topology processing system according to an embodiment of this application. In this embodiment of this application, the onsite terminal may communicate with the network management server. For example, the onsite terminal may communicate with the network management server through a wireless network or a wired network.

The onsite terminal may also be referred to as an onsite intelligent terminal. The onsite terminal is configured to collect an onsite image of an ODN. For example, the onsite terminal has a camera, and the camera can photograph an ODN device and a cable in an onsite ODN, to generate an onsite image. The cable is configured to connect a plurality of ODN devices, or is configured to connect the ODN device to another device in an optical communication system. For example, the cable is configured to connect the ODN device and an ONT, and the cable may be further configured to connect the ODN device and an OLT. The cable is a communications medium. For example, the cable may include at least one of an optical cable, a copper cable, or a coaxial cable. Specifically, a specific cable may be selected according to an application scenario of the optical communications system, and this is not limited herein.

There may be an identification code premade on a cable provided in this embodiment of this application, to identify different cables. For example, a ring identification code is disposed on the cable, and identification codes are continuously or alternately distributed on the cable. The identification code on the cable can be photographed by the camera of the onsite terminal. When there are a plurality of cables on an ODN, identification codes are separately disposed on the plurality of cables, and a prominent feature of the identification code on each cable is not blocked by the ODN device or another cable, so that the camera of the onsite terminal can successfully photograph the identification code on each cable. For example, in this embodiment of this application, the identification code on the cable may be a barcode, and the barcode on the cable is used as an identifier (ID), where the identification code includes but is not limited to one-dimensional barcode, a two-dimensional barcode, a color barcode, and another barcode pattern.

In some embodiments of this application, in addition to a function of collecting an onsite image of the ODN, the onsite terminal may further have an image analysis capability, that is, may analyze an onsite image collected by the onsite terminal, to identify a cable from the onsite image, and identify a port of an ODN device connected to the cable. Finally, the onsite terminal may further generate a correspondence between the ODN device, the port of the ODN device, and the cable. For example, the correspondence may include a physical connection relationship between the cable and the ODN device.

The network management server provided in this embodiment of this application is a server configured for optical communications network management. For example, the network management server may be an ODN topology management server. The network management server may obtain a correspondence between the ODN device, the port of the ODN device, and the cable. For example, the network management server may interact with the onsite terminal, to obtain the correspondence between the ODN device, the port of the ODN device, and the cable by using the onsite terminal. For another example, the network management server may further obtain the onsite image from the onsite terminal, and analyze the onsite image collected by the onsite terminal, to identify the cable from the onsite image and identify the port of the ODN device connected to the cable. Finally, the network management server may further generate the correspondence between the ODN device, the port of the ODN device, and the cable. For example, the correspondence may include the physical connection relationship between the cable and the ODN device.

Figure 4:
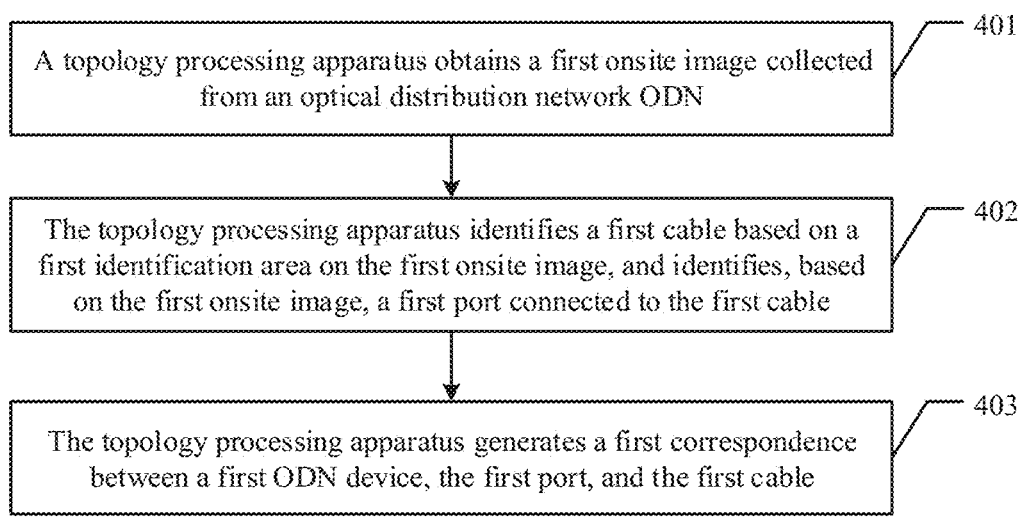
FIG. 4 is a schematic block flowchart of a topology processing method according to an embodiment of this application.

The following first describes in detail a topology processing method provided in an embodiment of this application. Referring to FIG. 4, an embodiment of this application provides a topology processing method, and mainly includes the following steps.

401. A topology processing apparatus obtains a first onsite image collected from an ODN, where the first onsite image includes at least an imaging of a first port of a first ODN device, the first port is connected to a first cable, a first identification area used to identify the first cable is disposed on the first cable, and the first onsite image further includes at least an imaging of the first identification area on the first cable.

Figure 5A:
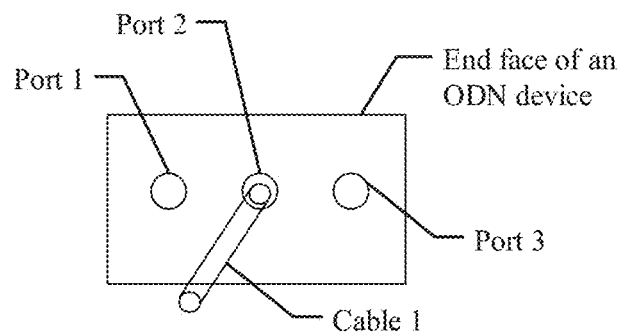
FIG. 5a is a schematic diagram of a correspondence between an ODN device, a port, and a cable according to an embodiment of this application.
Figure 5B:
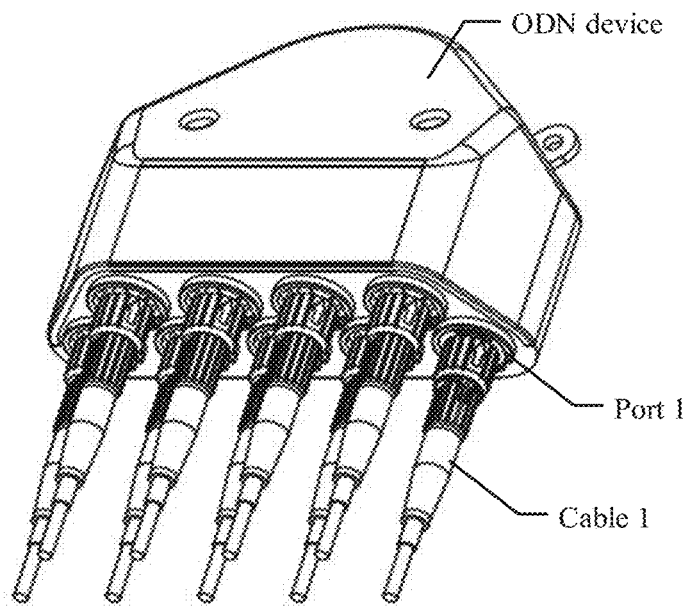
FIG. 5b is a schematic diagram of a correspondence between an ODN device, a port, and a cable according to an embodiment of this application.
Figure 5C:
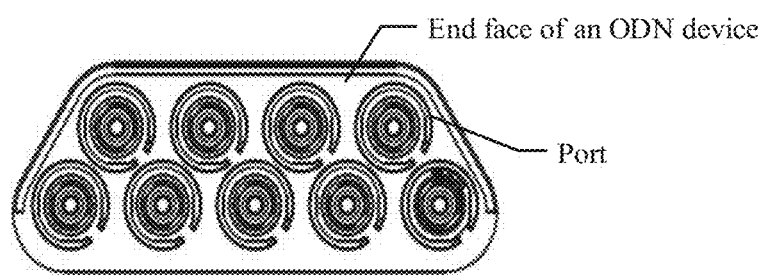
FIG. 5c is a schematic diagram of an arrangement manner of a plurality of ports of an ODN device according to an embodiment of this application.

In this embodiment of this application, a port is disposed on an ODN device. For example, at least one port is disposed on an end face of the ODN device. FIG. 5a is a schematic diagram of a correspondence between an ODN device, a port, and a cable according to an embodiment of this application. The ODN device shown in FIG. 5a is used as an example. The ODN device has three ports: a port 1, a port 2, and a port 3. The ODN device is connected to a cable through a port. For example, the cable is inserted into a port of the ODN device, to implement a physical connection between the cable and the ODN device. In FIG. 5a, that a cable 1 is inserted into the port 2 of the ODN device is used as an example. There may be an identification code premade on a cable provided in this embodiment of this application, to identify different cables. For example, an identification area is disposed on the cable. FIG. 5b is a schematic diagram of a correspondence between an ODN device, a port, and a cable according to an embodiment of this application. FIG. 5b is a three-dimensional diagram of the ODN device. The ODN device has a plurality of ports, and each port may be connected to one cable. For example, the ODN device has a port 1, and the port 1 is connected to a cable 1. FIG. 5c is a schematic diagram of an arrangement manner of a plurality of ports of an ODN device according to an embodiment of this application. The ODN device has a plurality of ports, and there are a plurality of arrangement manners of ports on the ODN device. For example, FIG. 5c shows a dual-row port arrangement manner. In actual application, an arrangement manner of ports on the ODN device may be determined based on a type of the ODN device and a quantity of cables that need to be connected. This is only example descriptions herein, and is not intended to limit this embodiment of this application.

In some embodiments of this application, the topology processing apparatus is an onsite terminal, and step 401 in which a topology processing apparatus obtains a first onsite image collected from an optical distribution network ODN includes:

the onsite terminal collects an onsite image of the ODN to obtain the first onsite image.

In this embodiment of this application, the first onsite image is first collected from the ODN. For example, when the topology processing apparatus is the onsite terminal, the onsite terminal may collect the onsite image of the ODN, to generate the first onsite image. The ODN includes the first ODN device and the first cable, the first ODN device has the first port. When the onsite terminal collects the onsite image of the ODN, the onsite terminal may photograph the first port and the first identification area on the first cable. Therefore, the first onsite image includes at least the imaging of the first port of the first ODN device, and the first onsite image further includes at least the imaging of the first identification area on the first cable.

In some embodiments of this application, the topology processing apparatus is a network management server, and step 401 in which a topology processing apparatus obtains a first onsite image collected from an optical distribution network ODN includes:

the topology processing apparatus receives the first onsite image sent by an onsite terminal, where the first onsite image is obtained by the onsite terminal by collecting the onsite image of the ODN.

After the onsite terminal obtains the first onsite image by collecting the onsite image of the ODN, the onsite terminal may send the first onsite image to the network management server, so that the network management server may receive the first onsite image from the onsite terminal.

402. The topology processing apparatus identifies the first cable based on the first identification area on the first onsite image, and identifies, based on the first onsite image, the first port connected to the first cable.

In this embodiment of this application, after the topology processing apparatus obtains the first onsite image, based on the descriptions of step 401, it can be learned that there is the first identification area on the first onsite image. Therefore, the topology processing apparatus parses the first identification area, and may identify the first cable based on the first identification area. For example, the topology processing apparatus may parse an identification code in the first identification area, to obtain an identifier of the first cable. Because the first onsite image further includes the imaging of the first port, the topology processing apparatus may determine, based on the first onsite image, that a port connected to the first cable is the first port of the first ODN device. For example, the topology processing apparatus obtains a port arrangement manner of the first ODN device, and identifies, based on a cable image of the first cable, which port of a plurality of ports of the first ODN device is connected to the first cable.

In some embodiments of this application, a cable connected to the ODN device and the identifier of the cable are not mutually blocked. The cable and the identifier of the cable can be identified through photographing at a specific angle, by using a special port arrangement design of the ODN device. That the cable and the identifier of the cable can be identified through photographing at a specific angle means that a row of cables near the onsite terminal can be directly identified, and cables in one row or several rows in the rear can be identified through a gap between the cables in the one row or several rows and cables in the middle of the onsite terminal. Being identifiable means that a prominent feature of a cable is not blocked, and the prominent feature is an image feature that plays an important role in cable identification.

Figure 6:
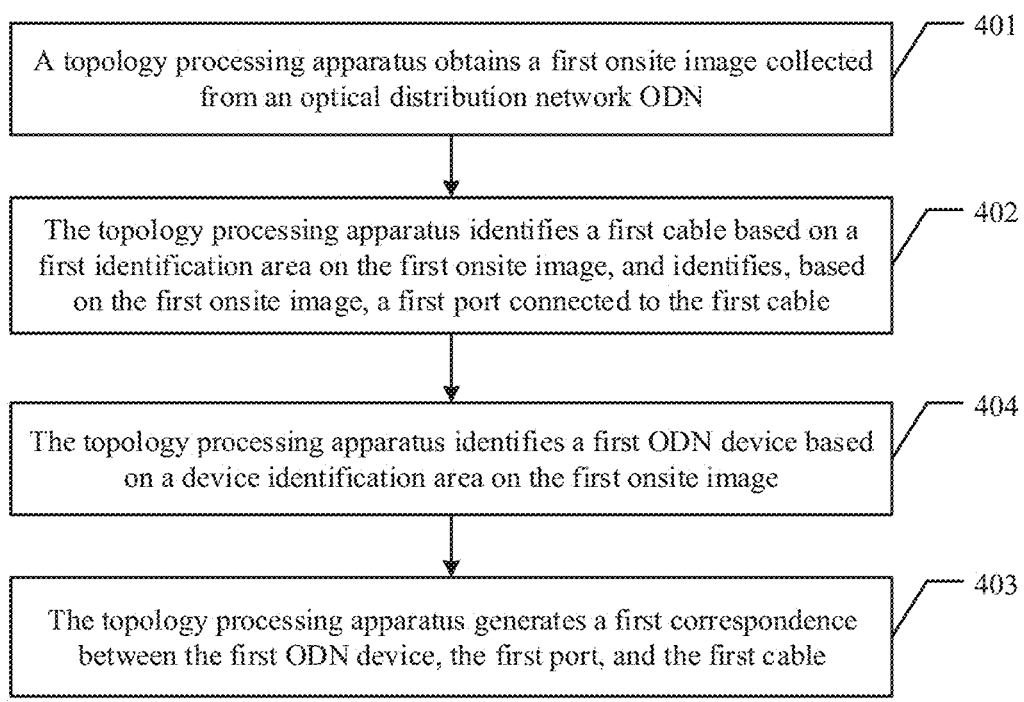
FIG. 6 is a schematic block flowchart of another topology processing method according to an embodiment of this application.

In some embodiments of this application, FIG. 6 is a schematic block flowchart of another topology processing method according to an embodiment of this application. There is a device identification area on the first ODN device, the device identification area is used to identify the first ODN device, and the first onsite image further includes an imaging of the device identification area. In addition to performing step 401 and step 402 in the topology processing method provided in this embodiment of this application, before performing step 403, the topology processing apparatus may further perform the following steps.

404. The topology processing apparatus identifies the first ODN device based on the device identification area on the first onsite image.

The first onsite image obtained by the topology processing apparatus includes the device identification area. For example, the first onsite image further includes the imaging of the device identification area, and may determine the first ODN device through image identification for the device identification area.

It is not limited that in some other embodiments of this application, in addition to identifying the first ODN device by using the device identification area, the topology processing apparatus may further obtain an identifier that is of the first ODN device and that is entered by the user, and may identify the first ODN device by using the identifier. For example, a user manually enters the identifier of the first ODN device into the onsite terminal, so that the onsite terminal or the network management server does not need to identify the first ODN device.

In some embodiments of this application, the device identification area is used to indicate at least one of the following information; the identifier of the first ODN device, a port arrangement manner of the first ODN device, a type of the first ODN device, a serial number of the first ODN device, or a production date of the first ODN device.

The identifier of the first ODN device may be an identifier different from that of another ODN device. For example, the identifier may be an identification code. The port arrangement manner of the first ODN device is a manner of port arrangement on an end face of the first ODN device. For example, the port arrangement manner of the ODN device means that each port of the ODN device can be identified through photographing by the onsite terminal at an angle, without being completely blocked. The port arrangement manner includes but is not limited to a single-row port design, a dual-row port design, and a W-shaped port design. For example, FIG. 5a to 5c schematically illustrates the single-row port design of the ODN device. The type of the first ODN device refers to information used to distinguish between different types of ODN device. For example, different types of information may be set for different types of ODN devices. The serial number of the first ODN device may be used to distinguish between the first ODN device and another ODN device. For example, the serial number of the first ODN device may be SN_FAT02. The production date of the first ODN device refers to a string of numbers formed by date values. For example, a production date of an ODN device is 201902010823, where 20190201 indicates year, month, and day, and 0823 indicates a production time. The production date of the first ODN device may also be used to distinguish between the first ODN device and another ODN device. It should be noted that, a specific implementation form of the device identification area in this embodiment of this application may not be limited to one or more of the foregoing examples.

In some embodiments of this application, the first onsite image further includes imagings of a plurality of ports of the first ODN device, and the identifying, based on the first onsite image, the first port connected to the first cable includes:

the topology processing apparatus identifies the first port based on a port arrangement manner observed by the plurality of ports and a relative position relationship between the first cable and a port.

Each port number may be identified based on a sequence of ports of the first ODN device, and a specific cable connected to each port may be identified based on the first cable connected to each port.

It is not limited that in some other embodiments of this application, the port number of the first ODN device may also be identified in another manner. For example, a second identification area may be disposed on a port of the ODN device, to identify a specific port number of a port corresponding to the second identification area. A port identification manner of the ODN device is not limited herein.

In step 402 of this application, the onsite terminal may identify the first cable based on the first identification area on the first onsite image, and identify, based on the first onsite image, the first port connected to the first cable. Alternatively, the network management server may identify the first cable based on the first identification area on the first onsite image, and identify, based on the first onsite image, the first port connected to the first cable. Specifically, whether the topology processing apparatus is specifically the onsite terminal or the network management server may be determined according to an application scenario, and this is not limited herein.

403. The topology processing apparatus generates a first correspondence between the first ODN device, the first port, and the first cable.

In this embodiment of this application, after the topology processing apparatus identifies the first cable and identifies that the first cable is connected to the first port of the first ODN device, the topology processing apparatus may generate the first correspondence between the first ODN device, the first port, and the first cable. For example, the first correspondence may include that the first ODN device is connected to the first cable through the first port.

In step 403 of this application, the onsite terminal may generate the first correspondence between the first ODN device, the first port, and the first cable. Alternatively, the network management server may generate the first correspondence between the first ODN device, the first port, and the first cable. Specifically, whether the topology processing apparatus is specifically the onsite terminal or the network management server may be determined according to an application scenario, and this is not limited herein.

Further, in some embodiments of this application, the topology processing apparatus is an onsite terminal, that is, in step 403, the onsite terminal generates the first correspondence between the first ODN device, the first port, and the first cable. In this implementation scenario, the topology processing method provided in this embodiment of this application may further include the following step:

the topology processing apparatus sends the first correspondence to the network management server.

The onsite terminal may communicate with the network management server. After the onsite terminal generates the first correspondence, the onsite terminal sends the first correspondence to the network management server, so that the network management server may receive the first correspondence, and may determine, based on the first correspondence, that the first ODN device, the first port, and the first cable are corresponding to each other.

Figure 7:
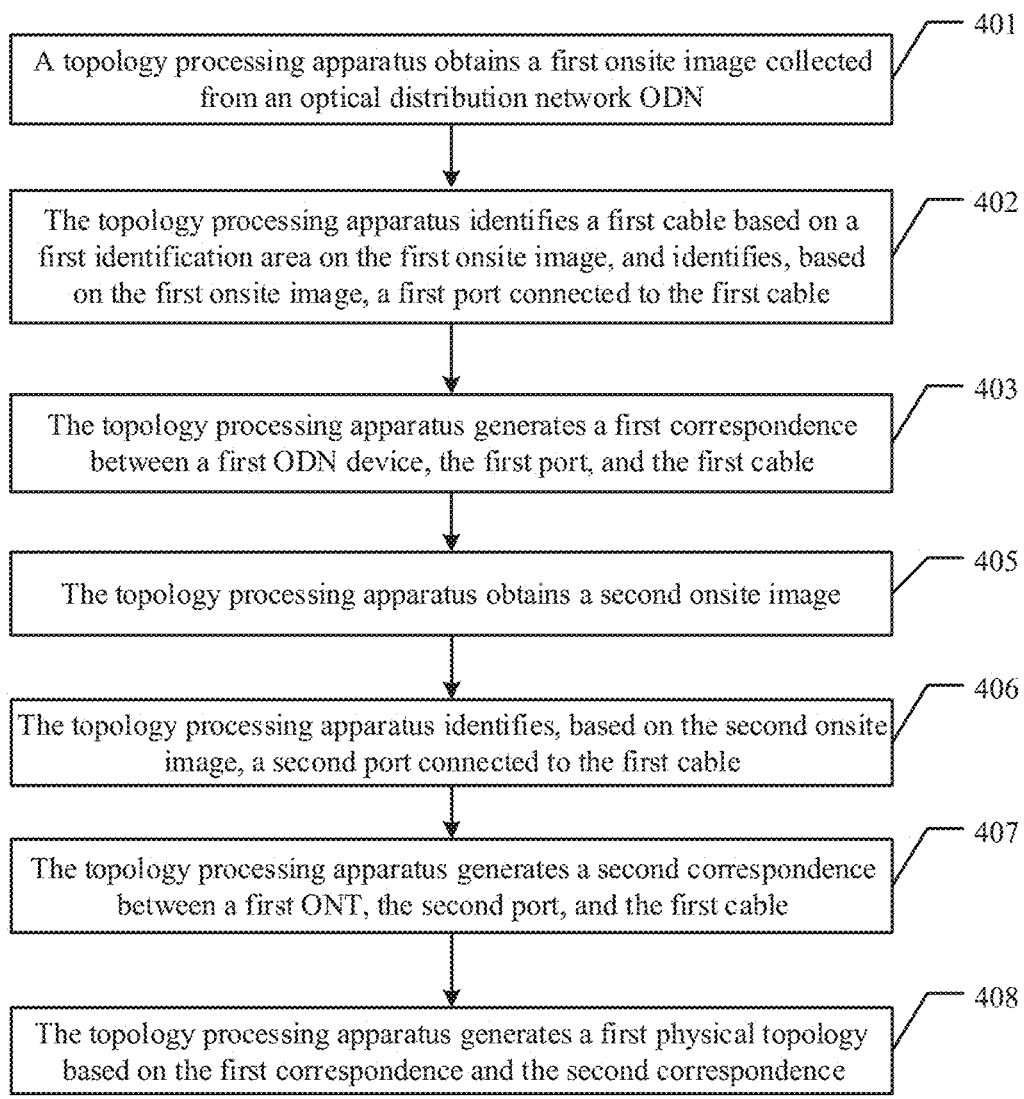
FIG. 7 is a schematic block flowchart of another topology processing method according to an embodiment of this application.

In some embodiments of this application, FIG. 7 is a schematic block flowchart of another topology processing method according to an embodiment of this application. In addition to performing step 401 to step 403 in the topology processing method provided in this embodiment of this application, the topology processing apparatus may further perform the following steps.

405. The topology processing apparatus obtains a second onsite image, where the second onsite image includes at least an imaging of a second port of a first ONT, and the second port is connected to the first cable.

In this embodiment of this application, the topology processing apparatus obtains the second onsite image. For example, the topology processing apparatus is an onsite terminal, and the onsite terminal may further collect the second onsite image of the first ONT. For another example, the topology processing apparatus is a network management server, the onsite terminal may further collect the second onsite image of the first ONT, then the onsite terminal sends the second onsite image to the network management server, and the network management server may obtain the second onsite image from the onsite terminal. The first ONT has at least one port. For example, the first ONT may include a second port. When collecting an onsite image of the first ONT, the onsite terminal may obtain an imaging of the second port of the first ONT. The second port of the first ONT is connected to a cable. For example, the second port may be connected to the first cable, and in this case, the first ODN device is connected to the first ONT through the first cable. For another example, the second port may be connected to a second cable, and if the other end of the second cable is connected to a second ODN device, the second ODN device is connected to the first ONT through the second cable.

406. The topology processing apparatus identifies, based on the second onsite image, the second port connected to the first cable.

In this embodiment of this application, the second onsite image includes at least the imaging of the second port of the first ONT. Therefore, the topology processing apparatus may identify, based on the second onsite image, the second port connected to the first cable. For details, refer to the descriptions of the identification manner of a connection between a cable and a port in step 402.

407. The topology processing apparatus generates a second correspondence between the first ONT, the second port, and the first cable.

In this embodiment of this application, after the topology processing apparatus identifies the first cable and identifies that the first cable is connected to the second port of the first ONT the topology processing apparatus may generate the second correspondence between the first ONT, the second port, and the first cable. For example, the second correspondence may include that the first ONT is connected to the first cable through the first port.

In step 407 of this application, the onsite terminal may generate the second correspondence between the first ONT, the second port, and the first cable. Alternatively, the network management server may generate the second correspondence between the first ONT, the second port, and the first cable. Specifically, whether the topology processing apparatus is specifically the onsite terminal or the network management server may be determined according to an application scenario, and this is not limited herein.

In some embodiments of this application, as shown in FIG. 7, after the topology processing apparatus generates the second correspondence, the topology processing method provided in this embodiment of this application may further include the following step.

408. The topology processing apparatus generates a first physical topology based on the first correspondence and the second correspondence.

The topology processing apparatus determines, based on the first correspondence, that the first ODN device, the first port, and the first cable are corresponding to each other, and determines, based on the second correspondence, that the first ONT, the second port, and the first cable are corresponding to each other. Therefore, the topology processing apparatus may determine a physical connection relationship between the first ODN device, the first ONT, and the first cable based on the first correspondence and the second correspondence. Therefore, the topology processing apparatus may generate the first physical topology, and the first physical topology includes specific devices and a physical connection relationship between devices.

In step 408 of this application, the onsite terminal may generate the first physical topology based on the first correspondence and the second correspondence. Alternatively, the network management server may generate the first physical topology based on the first correspondence and the second correspondence. Specifically, whether the topology processing apparatus is specifically the onsite terminal or the network management server may be determined according to an application scenario, and this is not limited herein.

Further, in some embodiments of this application, the topology processing apparatus is an onsite terminal, that is, in step 408, the onsite terminal generates the first physical topology based on the first correspondence and the second correspondence. In this implementation scenario, the topology processing method provided in this embodiment of this application may further include the following step:

the topology processing apparatus sends the first physical topology to the network management server.

The network management server may receive the first physical topology from the onsite terminal, and determine the physical connection relationship between the first ODN device, the first ONT, and the first cable by using the first physical topology.

In some embodiments of this application, in addition to performing step 401 to step 408 in the topology processing method provided in this embodiment of this application, the topology processing apparatus may further perform the following steps:

the topology processing apparatus obtains a third onsite image collected from the ODN, where the third onsite image includes at least an imaging of a third port of the second ODN device, and the third port is connected to the first cable;

the topology processing apparatus identifies, based on the third onsite image, the third port connected to the first cable; and the topology processing apparatus generates a third correspondence between the second ODN device, the third port, and the first cable.

If the first ODN device and the second ODN device are cascaded ODN devices, the onsite terminal may obtain the third onsite image by collecting an onsite image of the second ODN device. After the topology processing apparatus identifies the first cable and identifies that the first cable is connected to the third port of the second ODN device, the topology processing apparatus may generate the third correspondence between the second ODN device, the third port, and the first cable. For example, the third correspondence may include that the second ODN device is connected to the first cable through the third port.

In some embodiments of this application, in addition to performing step 401 to step 408 in the topology processing method provided in this embodiment of this application, the topology processing apparatus may further perform the following steps:

the topology processing apparatus obtains a fourth onsite image, where the fourth onsite image includes at least an imaging of a fourth port of the first OLT, and the fourth port is connected to the first cable;

the topology processing apparatus identifies, based on the fourth onsite image, the fourth port connected to the first cable; and the topology processing apparatus generates a fourth correspondence between the first ONT, the fourth port, and the first cable.

The onsite terminal may further collect an onsite image of the first OLT, to obtain the fourth onsite image. After the topology processing apparatus identifies the first cable and identifies that the first cable is connected to the fourth port of the first OLT, the topology processing apparatus may generate the fourth correspondence between the first OLT, the fourth port, and the first cable. For example, the fourth correspondence may include that the first OLT is connected to the first cable through the fourth port.

Further, in some embodiments of this application, the topology processing method provided in this embodiment of this application may further include the following step:

the topology processing apparatus generates the second physical topology based on the first correspondence and the fourth correspondence.

The topology processing apparatus determines, based on the first correspondence, that the first ODN device, the first port, and the first cable are corresponding to each other, and determines, based on the fourth correspondence, that the first OLT, the fourth port, and the first cable are corresponding to each other. Therefore, the topology processing apparatus may determine a physical connection relationship between the first ODN device, the first OLT, and the first cable based on the first correspondence and the fourth correspondence. Therefore, the topology processing apparatus may generate the second physical topology, and the second physical topology includes specific devices and a physical connection relationship between devices.

Figure 8:
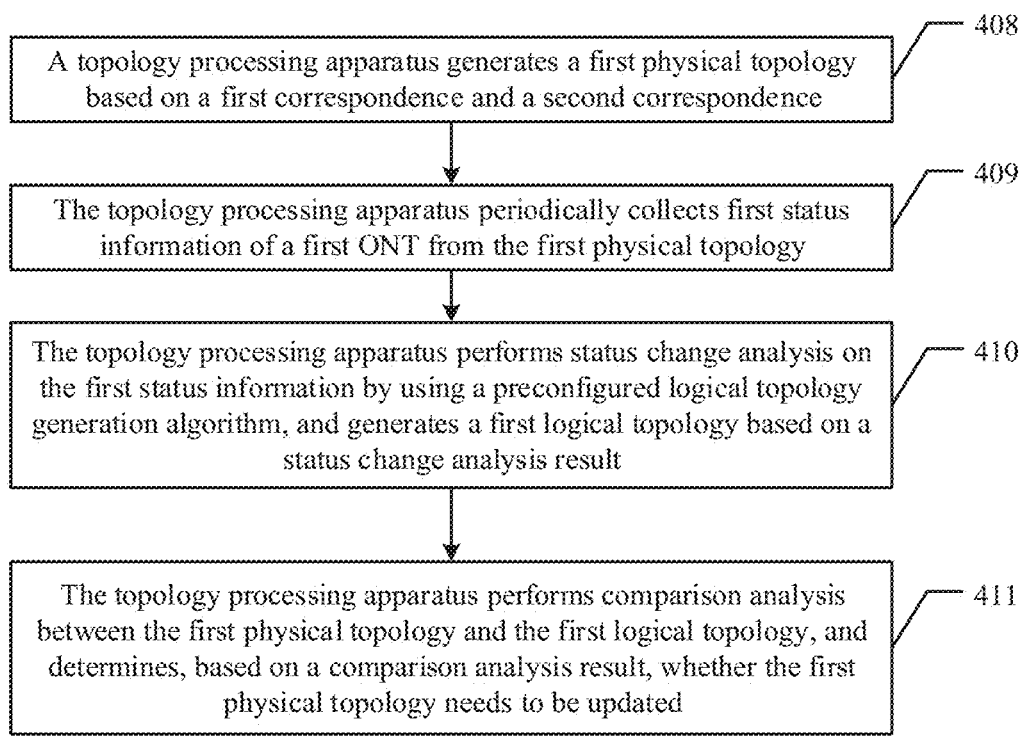
FIG. 8 is a schematic block flowchart of another topology processing method according to an embodiment of this application.

In some embodiments of this application, FIG. 8 is a schematic block flowchart of another topology processing method according to an embodiment of this application. The topology processing apparatus is a network management server. In addition to performing step 408 in the topology processing method provided in this embodiment of this application, the topology processing apparatus may further perform the following steps.

409. The topology processing apparatus periodically collects first status information of the first ONT from the first physical topology.

In this embodiment of this application, in step 408, the onsite terminal may generate the first physical topology, and then send the first physical topology to the network management server. Alternatively, the network management server may generate the first physical topology. After the network management server obtains the first physical topology, the network management server periodically collects the first status information of the first ONT from the first physical topology by using the first physical topology as a reference. A length of a collection period of status information is not limited herein, and the collection period may be specifically configured according to an application scenario.

The first status information includes various status parameters of a running status of the first ONT. For example, the first status information includes the performance data of the first ONT or the alarm data of the first ONT. The performance data of the first ONT may be an optical power of the first ONT, a bit error rate of the first ONT, or other data. The alarm data of the first ONT may be alarm information sent by the first ONT, for example, alarm information sent when the first ONT is disconnected, or alarm information sent when the optical power of the first ONT exceeds a threshold.

In some other embodiments of this application, if the topology processing apparatus may further obtain the second physical topology, and the second physical topology further includes the first OLT, the topology processing apparatus periodically collects second status information of the first OLT from the second physical topology, where the second status information includes performance data of the first OLT or alarm data of the first OLT.

410. The topology processing apparatus performs status change analysis on the first status information by using a preconfigured logical topology generation algorithm, and generates a first logical topology based on a status change analysis result, where the first logical topology includes a correspondence between the first ODN device, the first cable, and the first ONT.

In this embodiment of this application, after obtaining the first status information of the first ONT, the topology processing apparatus may perform status change analysis on the first status information of the first ONT. For example, in this embodiment of this application, the topology processing apparatus may use the logical topology generation algorithm, where the logical topology generation algorithm may include a status change analysis method, to analyze a status change of the first status information of the first ONT and identify, based on the status change of the first status information of the first ONT, which specific ODN device is connected to specific ONTs. For example, if status change patterns of a plurality of ONTs have a same variation within a period of time, these ONTs are connected to a same ODN device. Without limitation, the logical topology generation algorithm used in this embodiment of this application has a plurality of implementations, and a corresponding status change analysis method may be used based on different content of collected status information. Through status information analysis, which ONTs are connected to a same ODN device can be identified, and which ONTs belong to different ODN devices can be identified, and through status information analysis, which ONTs are faulty and cannot process optical signals can also be identified.

In this embodiment of this application, after completing the status change analysis, the topology processing apparatus may obtain a status change analysis result, and finally generate the first logical topology based on the status change analysis result. The first logical topology includes a correspondence between the first ODN device, the first cable, and the first ONT.

In some other embodiments of this application, if the topology processing apparatus may further obtain the second physical topology, and the second physical topology further includes the first OLT, the topology processing apparatus periodically collects second status information of the first OLT from the second physical topology, performs status change analysis based on the second status information of the first OLT, and with reference to the status change analysis of the first status information in step 410, generates a second logical topology based on a status change analysis result, where the second logical topology includes a correspondence between the first OLT, the first ODN device, the first cable, and the first ONT.

In some embodiments of this application, step 410 in which the topology processing apparatus performs status change analysis on the first status information by using a preset logical topology generation algorithm includes:

the topology processing apparatus obtains, based on the first status information, a status change feature that is of the first ONT in a first time period; and the topology processing apparatus performs similarity cluster analysis on the status change feature of the first ONT in the first time period.

The topology processing apparatus analyzes the first status information of the first ONT, sets the first time period, and obtains the status change feature of the first ONT in the first time period, that is, may obtain a status change pattern of the first ONT. It should be noted that, in this embodiment of this application, the first ONT may be one or more ONTs of a specific type. The topology processing apparatus performs similarity cluster analysis on the status change feature of the first ONT in the first time period in a similarity cluster analysis manner. For example, ONTs that have a same variation in a same time period are classified as ONTs that are connected to a same ODN device, and a used method includes but is not limited to data feature change mining or cluster analysis. A level of an ODN device is identified, and a change of an ODN connection relationship is continuously monitored.

411. The topology processing apparatus performs comparison analysis between the first physical topology and the first logical topology, and determines, based on a comparison analysis result, whether the first physical topology needs to be updated.

In this embodiment of this application, after the topology processing apparatus generates the first logical topology, the topology processing apparatus performs comparison analysis on the first physical topology and the first logical topology, for example, compares whether the first physical topology and the first logical topology have different connection relationships, for example, that the first ODN device is connected to the first ONT is recorded in the first physical topology, but that the first ODN device is connected to the first ONT is not recorded in the first logical topology. Finally, the topology processing apparatus may determine, based on the comparison analysis result, whether the first physical topology needs to be updated. It can be learned from the topology processing method provided in this embodiment of this application that, the topology processing apparatus automatically matches, sorts, and reviews a change of a to-be-sorted logical topology, thereby automatically sorting and reviewing resources in the optical fiber distribution network, and improving reliability of sorting resources in the optical fiber distribution network. In this way, resources on the optical network are sorted simply, quickly, automatically, and reliably, human resource investment is reduced, check efficiency is greatly improved, and check work of optical network resources is regularized.

In some embodiments of this application, step 411 of the determining, based on a comparison analysis result, whether the first physical topology needs to be updated includes:

when the comparison analysis result is that the first physical topology and the first logical topology have different correspondences, sending, by the topology processing apparatus, an onsite review instruction, and determining, based on an onsite review result, whether the first physical topology needs to be updated.

The comparison analysis result is that the first physical topology and the first logical topology have different correspondences. For example, whether the first physical topology and the first logical topology have different connection relationships is compared. In this case, the topology processing apparatus sends the onsite review instruction, that is, the topology processing apparatus may send a warning message, and the topology processing apparatus generates a work order used for performing physical topology troubleshooting onsite. After receiving the work order, an implementation engineer goes to a site of the ODN device to conduct a survey, so as to feed back, according to an actual situation, whether the first physical topology needs to be updated. In this embodiment of this application, when the first physical topology and the first logical topology have different correspondences, the topology processing apparatus sends the onsite review instruction, to facilitate maintenance for an optical communications network, and improve network management efficiency.

Figure 9:
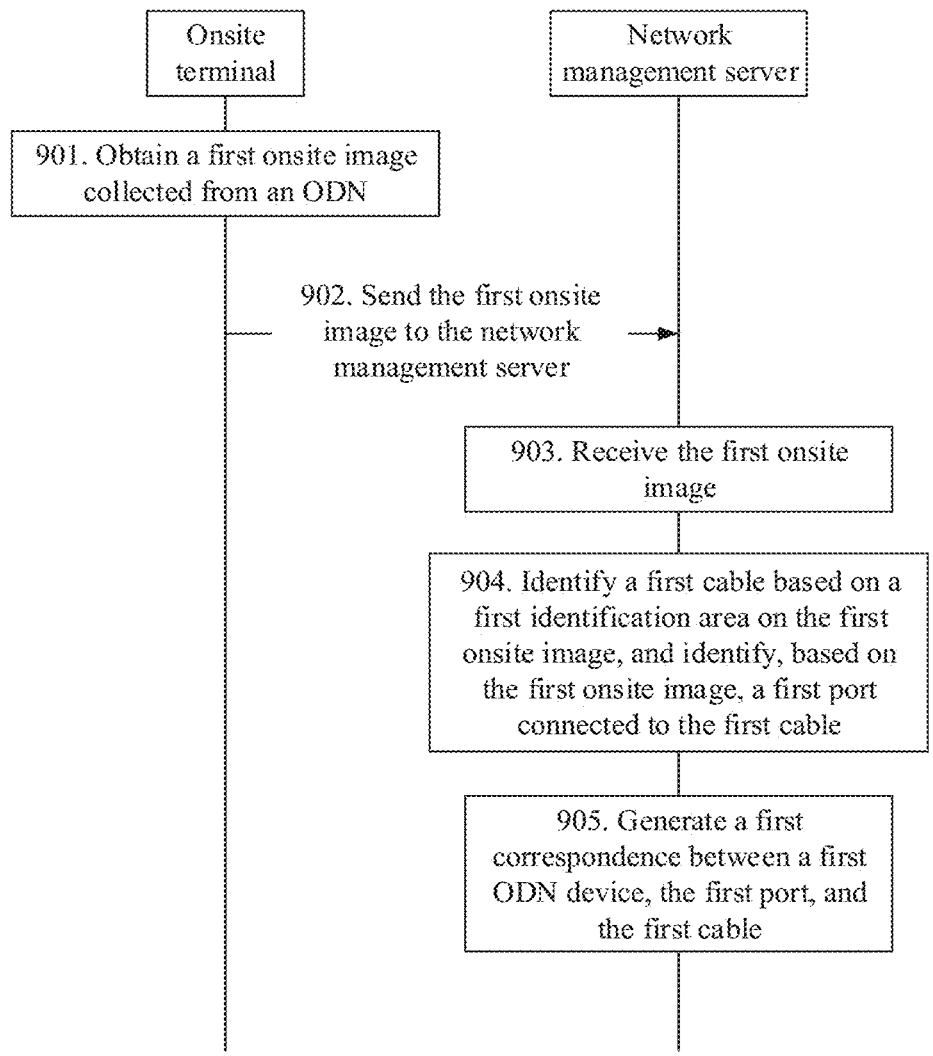
FIG. 9 is a schematic flowchart of interaction between an onsite terminal and a network management server according to an embodiment of this application.

In some embodiments of this application, based on the topology processing system shown in FIG. 3, the topology processing system includes an onsite terminal and a network management server. FIG. 9 is a schematic flowchart of interaction between an onsite terminal and a network management server according to an embodiment of this application. The interaction mainly includes the following procedures.

901. The onsite terminal obtains a first onsite image collected from an optical distribution network ODN, where the first onsite image includes at least an imaging of a first port of a first ODN device, the first port is connected to a first cable, there is a first identification area used to identify the first cable on the first cable, and the first onsite image further includes at least an imaging of the first identification area on the first cable.

902. The onsite terminal sends the first onsite image to the network management server.

903. The network management server receives the first onsite image.

904. The network management server identifies the first cable based on the first identification area on the first onsite image, and identifies, based on the first onsite image, the first port connected to the first cable.

905. The network management server generates a first correspondence between the first ODN device, the first port, and the first cable.

It can be learned from the foregoing example descriptions that, the first onsite image collected from the ODN is first obtained, where the first onsite image includes at least the imaging of the first port of the first ODN device, the first port is connected to the first cable, there is the first identification area used to identify the first cable on the first cable, and the first onsite image further includes at least the imaging of the first identification area on the first cable; the first cable is identified based on the first identification area on the first onsite image, and the first port connected to the first cable is identified based on the first onsite image; and finally, the first correspondence between the first ODN device, the first port, and the first cable is generated. In this embodiment of this application, the first cable may be identified from the first onsite image by analyzing the first onsite image obtained through ODN onsite collection, and that the first cable is connected to the first port of the first ODN device may also be identified. The correspondence between the first ODN device, the first port, and the first cable may be further generated based on the foregoing image identification result. Therefore, in comparison with the prior art, in this embodiment of this application, automatic sorting and reviewing of resources on an ODN is implemented without recording by using paper labels, so that resources in the optical distribution network are sorted simply, fast, automatically, and reliably, thereby reducing human resources, improving management efficiency of the ODN device, and reducing management costs.

Figure 10:
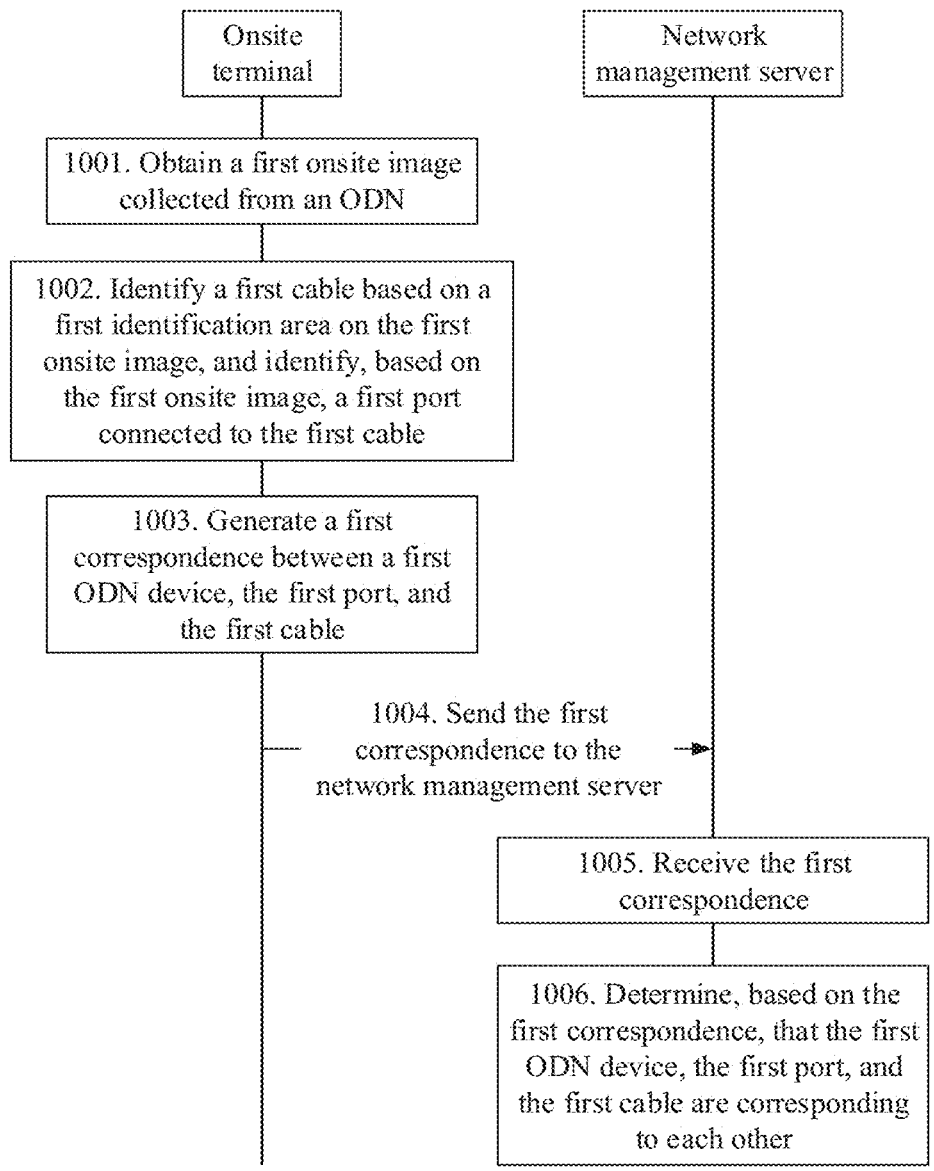
FIG. 10 is another schematic flowchart of interaction between an onsite terminal and a network management server according to an embodiment of this application.

In some other embodiments of this application, based on the topology processing system shown in FIG. 3, the topology processing system includes an onsite terminal and a network management server. FIG. 10 is another schematic flowchart of interaction between an onsite terminal and a network management server according to an embodiment of this application. The interaction mainly includes the following procedures.

1001. The onsite terminal obtains a first onsite image collected from an optical distribution network ODN, where the first onsite image includes at least an imaging of a first port of a first ODN device, the first port is connected to a first cable, there is a first identification area used to identify the first cable on the first cable, and the first onsite image further includes at least an imaging of the first identification area on the first cable.

1002. The onsite terminal identifies the first cable based on the first identification area on the first onsite image, and identifies, based on the first onsite image, the first port connected to the first cable.

1003. The onsite terminal generates a first correspondence between the first ODN device, the first port, and the first cable.

1004. The onsite terminal sends the first correspondence to the network management server.

1005. The network management server receives the first correspondence.

1006. The network management server determines, based on the first correspondence, that the first ODN device, the first port, and the first cable are corresponding to each other.

It can be learned from the foregoing example descriptions that, the first onsite image collected from the ODN is first obtained, where the first onsite image includes at least the imaging of the first port of the first ODN device, the first port is connected to the first cable, there is the first identification area used to identify the first cable on the first cable, and the first onsite image further includes at least the imaging of the first identification area on the first cable; the first cable is identified based on the first identification area on the first onsite image, and the first port connected to the first cable is identified based on the first onsite image; and finally, the first correspondence between the first ODN device, the first port, and the first cable is generated. In this embodiment of this application, the first cable may be identified from the first onsite image by analyzing the first onsite image obtained through ODN onsite collection, and that the first cable is connected to the first port of the first ODN device may also be identified. The correspondence between the first ODN device, the first port, and the first cable may be further generated based on the foregoing image identification result. Therefore, in comparison with the prior art, in this embodiment of this application, automatic sorting and reviewing of resources on an ODN is implemented without recording by using paper labels, so that resources in the optical distribution network are sorted simply, fast, automatically, and reliably, thereby reducing human resources, improving management efficiency of the ODN device, and reducing management costs.

To better understand and implement the foregoing solutions in the embodiments of this application, the following uses a corresponding application scenario as an example for detailed description.

To resolve problems of low resource accuracy and inconvenient information update in an optical network caused by labeling an ODN device in a PON conventionally by using a paper label, an embodiment of this application provides a method for intelligently identifying an optical network resource and automatically determining a connection relationship between ODN devices, to accurately manage topology resources (such as optical fiber resources, port resources, and an optical fiber connection relationship) on the optical network. A newly created physical topology 1 is used as a reference, and then an ODN topology management server regularly analyzes a large amount of OLT status information and ONT status information to establish a logical topology 2. The changed logical topology 2 is used to drive physical onsite troubleshooting and the latest physical topology 1 is used to calibrate the logical topology 2. In this way, an ODN topology can be restored accurately, thereby helping improve a management capability for optical network resources and work efficiency of a maintenance operation engineer.

In this embodiment of this application, a topology refers to a network structure including a network node device and a communications medium. A physical topology diagram is a network structure obtained through identification based on an actual physical connection between ODN devices. Based on the physical topology diagram, if a fault occurs or a fault is going to occur, the physical topology diagram can illustrate, in a timely and specific manner, to a network administrator which network device is faulty. For example, if a switch on a network is faulty, based on the physical topology diagram, a network system can illustrate to the administrator which port of which switch of a large quantity of switch devices is faulty, and which network devices are connected to this port. This facilitates maintenance for the network administrator.

This network management server provided in this embodiment of this application may be specifically an ODN topology management server. The ODN topology management server generates a logical topology. The logical topology illustrates how devices communicate with each other by using a physical topology. In this embodiment of this application, a network structure is obtained by analyzing communications service data of an OLT and an ONT such as an optical power and other status information, so as to obtain the logical topology.

Figure 11:
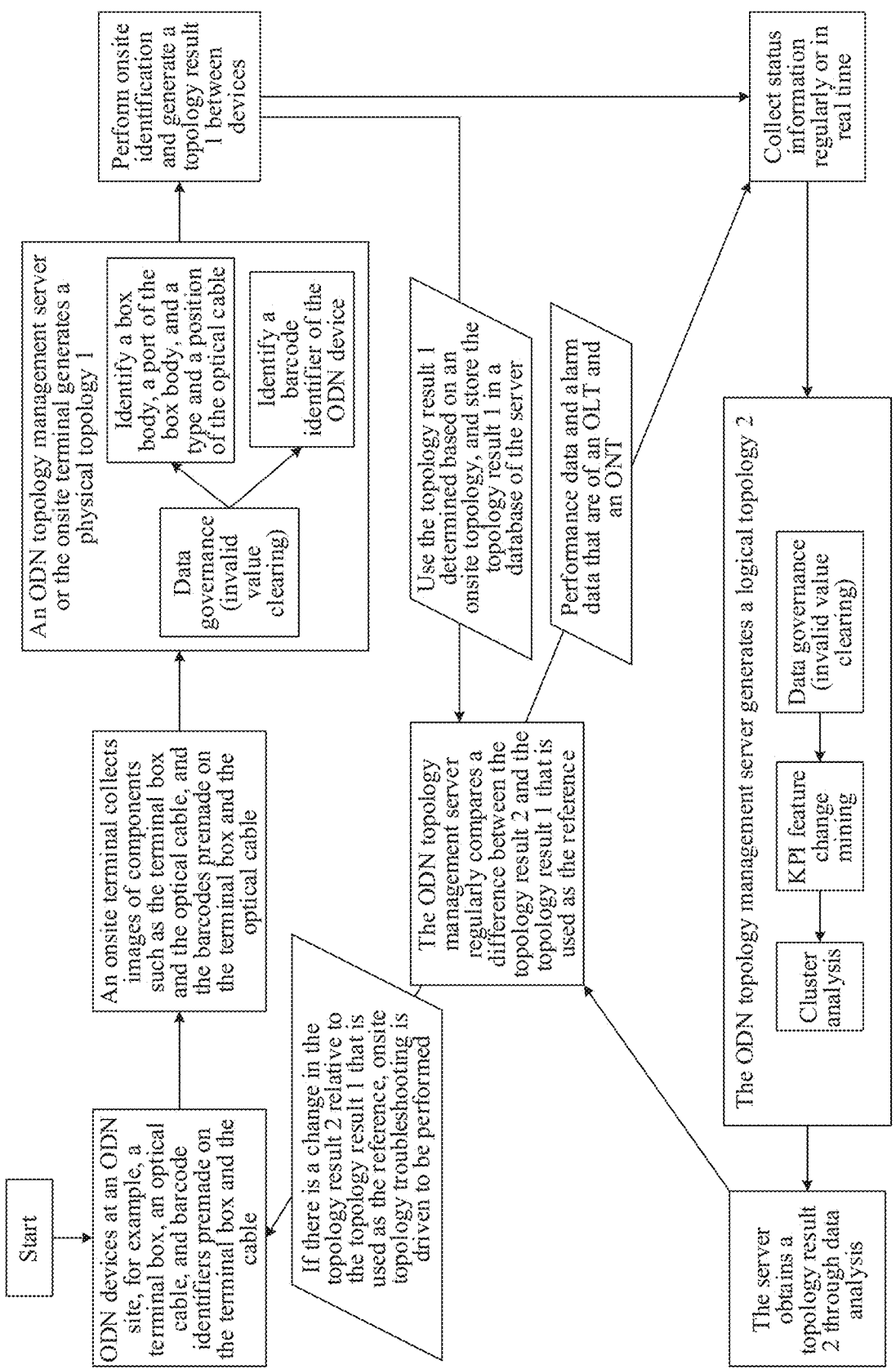
FIG. 11 is a schematic diagram of an implementation scenario for managing an ODN topology according to an embodiment of this application.

FIG. 11 is a schematic diagram of an implementation scenario for managing an ODN topology according to an embodiment of this application. The implementation scenario mainly includes the following procedures.

First, an ODN device is configured at an ODN site. For example, the ODN device may be a terminal box, and an optical splitter is disposed in the terminal box. For example, there are barcode identifiers premade on the terminal box, a cable, or a terminal box and a cable, and for example, the cable is an optical cable. An onsite terminal collects images of components such as the terminal box and the optical cable and images of the barcodes on the terminal box and the optical cable. An ODN topology management server or an onsite terminal generates a physical topology 1. The ODN topology management server or the onsite terminal further needs to perform data governance, for example, invalid value clearing, identifying a box body, a port of the box body, and a type and a position of the optical cable, identifying a barcode identifier of the ODN device. The ODN topology management server performs onsite identification and generates a topology result 1 between devices, uses the topology result 1, determined based on an onsite topology, as a reference, and stores the topology result 1 in a database of the server. Status information of an OLT and an ONT is collected regularly or in real time. For example, performance data and alarm data of the OLT and the ONT may be collected. The ODN topology management server generates a logical topology 2, and then performs cluster analysis, key performance indicator (KPI) feature change mining, data governance (invalid value clearing), and the like. The server obtains a topology result 2 through data analysis. The ODN topology management server periodically compares a difference between the topology result 2 and the topology result 1 that is used as the reference. If there is a change in the topology result 2 relative to the topology result 1 that is used as the reference, onsite topology troubleshooting is driven to be performed.

An embodiment of this application provides an enhanced ODN network topology management system. A connection relationship between a terminal box and an optical cable is generated in an image identification manner, where an onsite terminal, an ODN topology management server, the terminal box, and the optical cable are included.

(1) Barcodes premade on the terminal box and the optical cable are used as ID identifiers, including but being not limited to one-dimensional barcode, a two-dimensional barcode, a color barcode, and another barcode pattern.

(2) The onsite terminal collects photos or videos of components such as the terminal box and the optical cable, and photos or videos of the barcode IDs on the components. Through image analysis, types and positions that are of a box body, a port of the box body, and the optical cable, and the IDs identifiers on the components may be identified.

(3) A connection relationship between ODN devices may be automatically identified and generated, a physical topology 1 is generated as a reference, and information is reported to the ODN topology management server and is stored in a database.

(4) The newly created physical topology 1 is used as the reference, and then the ODN topology management server regularly analyzes a large amount of OLT status information and ONT status information to establish a logical topology 2, where the status information includes an optical power and a BER.

(5) The changed logical topology 2 is used to drive onsite physical onsite troubleshooting and the latest physical topology 1 is used to calibrate the logical topology 2. In this way, an ODN topology is restored accurately.

Specifically, the physical topology 1 is used as the reference in initial construction, the ODN physical topology 1 is generated through image identification on a new ODN, where the ODN physical topology 1 is refined to a port level of an optical splitter, and information about the physical topology 1 is reported to the ODN topology management server.

The ODN topology management server generates an ODN logical topology 2 by using a logical topology generation algorithm, monitors, in real time or periodically by using an OLT, status information such as an optical power of an ONT connected to an OLT port, and classifies ONTs that have a same variation in a same time period as ONTs that are connected to a same optical splitter. The used method includes but is not limited to data feature change mining, cluster analysis, and the like. A level of an optical splitter is identified, a change of the ODN connection relationship is continuously monitored, and information about the logical topology 2 is reported to the ODN topology management server.

When the ODN is created, the logical topology 2 is caliberatedbased on the physical topology 1. Then, the ODN topology management server compares the ODN logical topology 2 that is generated based on the logical topology generation algorithm with the physical topology 1 that is generated through ODN image identification, and continuously refreshes the ODN logical topology 2. If the logical topology 2 is inconsistent with the reference, prewarning is performed or an instruction is delivered to identify and compare inconsistencies, or even manual review is performed. An onsite construction engineer goes to the site of the ODN, to check whether the physical topology 1 has changed, and re-establishes a reference based on the physical topology 1 obtained through onsite identification.

Figure 12:
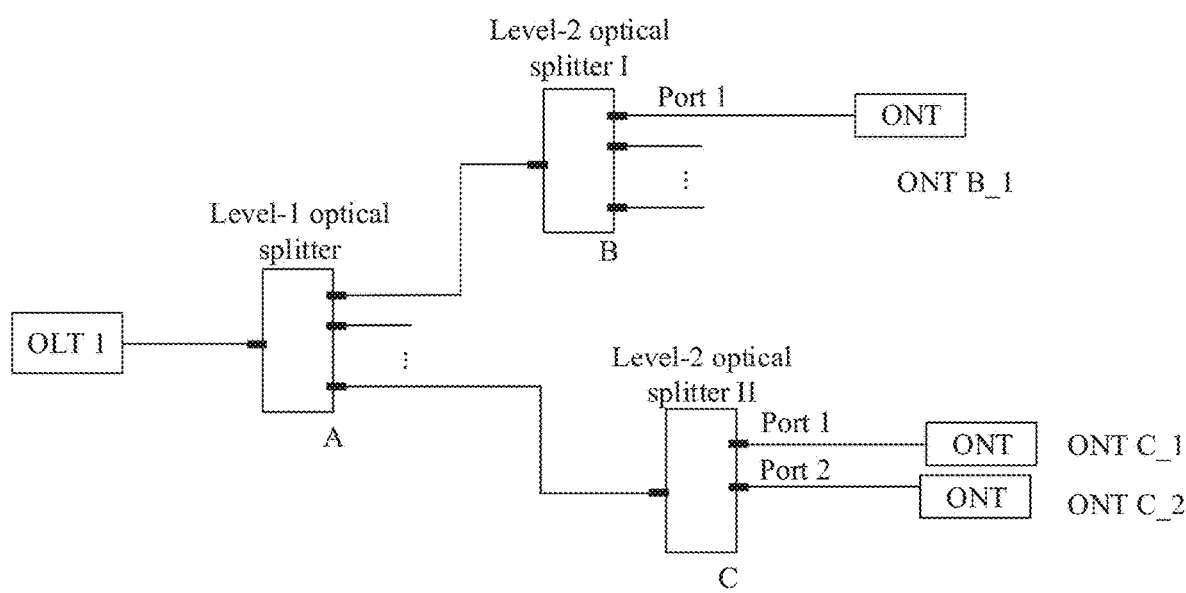
FIG. 12 is a schematic diagram of a system architecture of an optical communications network according to an embodiment of this application.

In the topology processing method provided in this embodiment of this application, a level-2 optical splitter network is used as an example for description. The network is merely used for description, and is not used to limit this embodiment of this application. FIG. 12 is a schematic diagram of a system architecture of an optical communications network according to an embodiment of this application. The optical communications network may include: an OLT 1, a level-1 optical splitter, a level-2 optical splitter I, a level-2 optical splitter II, an ONT B_1, an ONT C_1, and an ONT C_2. A, B, and C refer to photographing positions of an onsite terminal. For example, in an onsite construction phase in a level-2 splitting scenario, a combiner end of a level-1 optical splitter A is connected to an OLT 01, and two level-2 optical splitters: an optical splitter B and optical splitter C, are installed at a splitter end. The optical splitter B and optical splitter C are installed in a terminal box, and a port number of the optical splitter is in a one-to-one corresponding with a port number of the terminal box.

Figure 13:
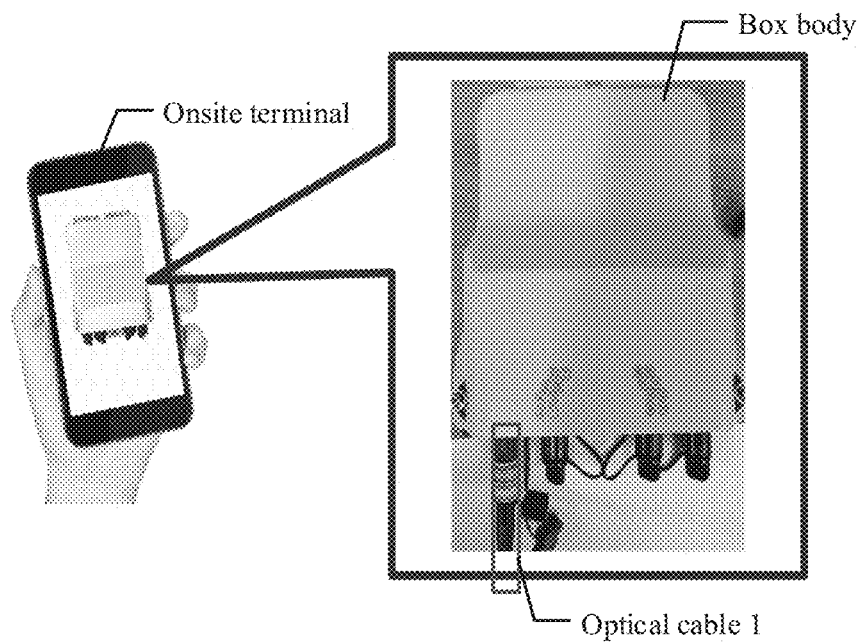
FIG. 13 is a schematic diagram of collecting images of an ODN device and an optical cable 1 by an onsite terminal according to an embodiment of this application.

It is assumed that the ONT B_1 needs to be installed on a port 1 of the optical splitter B. On an optical cable connector required for onsite construction, a ring barcode on one side close to the terminal box is used as an ID identifier. A construction engineer installs, at the level-2 optical splitter B, one end of a cable that connects the ONT B_1 and the optical splitter B to the port 1 of the terminal box, and then collects photos or videos of components such as the terminal box and the cable, and photos or videos of the barcodes on the terminal box and on the cable by using an image collection apparatus. FIG. 13 is a schematic diagram of collecting images of an ODN device and an optical cable 1 by an onsite terminal according to an embodiment of this application. A physical connection relationship between a terminal box and an optical cable is established through photographing at an optical splitter B (that is, the level-2 optical splitter I).

An ODN topology management server or an onsite intelligent terminal intelligently generates a connection relationship that is at a position of the optical splitter B and that is a part of a physical topology 1. The connection relationship may be used for identifying that a terminal box model is HW2802, that a serial number is SN_FAT01, that the optical splitter B has been installed inside, and that there are four ports in total. A port 1 is connected to an optical cable, with a serial number SN_CABLE2001 of the optical cable and a length of 100 meters. The other three ports are empty as no optical cables are inserted.

The other end of the optical cable is connected to an ONT B_1 at the home of a terminal user, and the onsite intelligent terminal records a connection relationship between the optical cable and the ONT B_1. An onsite-determined connection relationship between the level-2 optical splitter B, the optical cable, and the ONT B_1 is used as a reference to generate a physical topology 1, and the physical topology 1 is stored in a database of the server Table 1 shows a partial physical topology 1 from the level-2 optical splitter B to an ONT provided in this embodiment of this application.

| Level-2 optical splitter | Port number | Optical cable | ONT |
|---|---|---|---|
| Optical splitter B Terminal box model: HW2802 Serial number: SN_FAT01 | 1 | Connected to the port 1 SN_CABLE2001 Length: 100 meters | ONT B_1 |
| | 2 | Empty | Empty |
| | 3 | Empty | Empty |
| | 4 | Empty | Empty |

Figure 14:
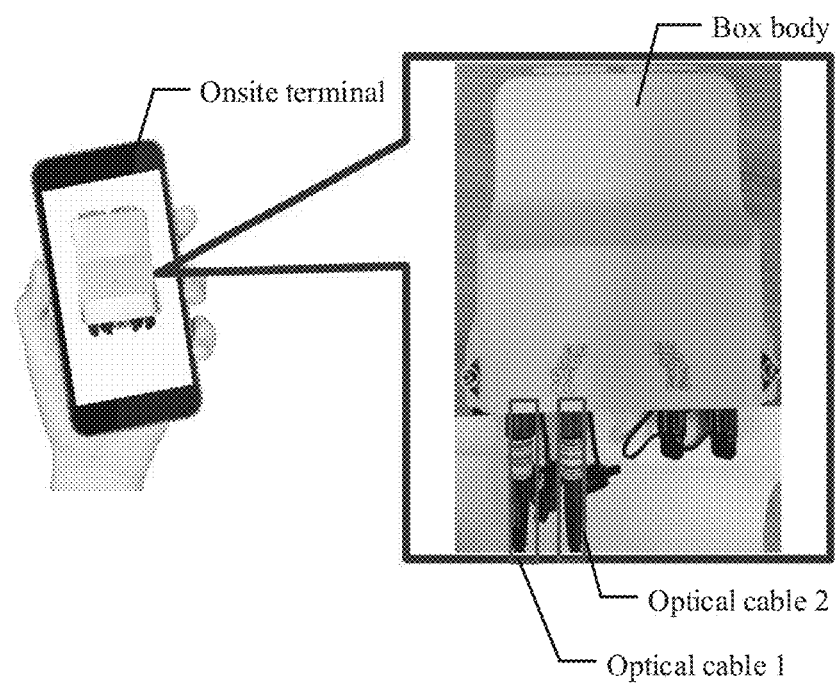
FIG. 14 is a schematic diagram of collecting images of an ODN device, an optical cable 1, and an optical cable 2 by an onsite terminal according to an embodiment of this application.

FIG. 14 is a schematic diagram of collecting images of an ODN device, an optical cable 1, and an optical cable 2 by an onsite terminal according to an embodiment of this application. A physical connection relationship between a terminal box and an optical cable is established through photographing at an optical splitter C (the level-2 optical splitter II). Similarly, at the level-2 optical splitter C, a construction engineer inserts one end of a cable that is connected to an ONT C_1 and an ONT C_2 to a corresponding port of a terminal box 2. Then, an image collection apparatus is used to collect photos or videos of components such as the terminal box and the optical cable, and photos or videos of barcodes on the terminal box and the optical cable.

An ODN topology management server or an onsite intelligent terminal intelligently generates a connection relationship that is at a position of the optical splitter B and that is a part of a physical topology 1. The connection relationship may be used for identifying that a terminal box model is HW2802, that a serial number is SN_FAT02, that the optical splitter C has been installed inside, and that there are four ports in total. Ports 3 and 4 are empty as no optical cables are inserted. A port 1 is connected to an optical cable, with a serial number SN_CABLE2002 of the optical cable and a length of 50 meters. The other end of the optical cable is connected to an ONT C_1 at the home of a terminal user, and a connection relationship between the optical cable and the ONT C_1 is recorded. Each optical cable has a unique ID number. At delivery, length information is bound to the ID number, and are stored in the ODN topology management server and a length of an optical cable can be determined if the ID is identified next time.

A port 2 is connected to an optical cable, with a serial number SN_CABLE2003 of the optical cable and a length of 150 meters. The other end of the optical cable is connected to an ONT C_2 at the home of the terminal user, and the onsite intelligent terminal records a connection relationship between the optical cable and the ONT C_2.

An onsite-determined connection relationship between the level-2 optical splitter C, the optical cable SN_CABLE2002, the optical cable SN_CABLE2003, the ONT C_1, and the ONT C_2 is used as a reference to generate a physical topology 1, and the physical topology 1 is stored in a database of the server. Table 2 shows a partial physical topology 1 from the level-2 optical splitter C to an ONT provided in this embodiment of this application.

| Level-2 optical splitter | Port number | Optical cable | ONT |
|---|---|---|---|
| Optical splitter C Terminal box model: HW2802 Serial number: SN_FAT02 | 1 | Connected to the port 1 SN_CABLE2002 Length: 50 meters | ONT C_1 |
| | 2 | Connected to the port 2 SN_CABLE2003 Length: 150 meters | ONT C_2 |
| | 3 | Empty | Empty |
| | 4 | Empty | Empty |

A complete ODN physical topology 1 is generated based on a combination of an onsite topology of a level-2 optical splitter and information about an onsite topology recorded during construction of a level-1 optical splitter, and is stored in the database of the ODN topology management server as a reference topology. Table 3 shows the complete ODN physical topology 1 provided in this embodiment of this application.

| OLT | Optical cable | Level-1 optical splitter | Port number | Optical cable | Level-2 optical splitter | Port number | Optical cable | ONT |
|---|---|---|---|---|---|---|---|---|
| OLT 01 | SN_CABLE01 | Optical splitter A Terminal box model: HW2801 Serial number: SN_00 | 1 | SN_CABLE1001 Length: 1000 meters | Optical splitter B Terminal box model: HW2802 Serial number: SN_FAT01 | 1 | Connected to the port 1 SN_CABLE2001 Length: 100 meters | ONT B_1 |
| | | | | | | 2 | Empty | Empty |
| | | | | | | 3 | Empty | Empty |
| | | | | | | 4 | Empty | Empty |
| | | | 2 | SN_CABLE1002 Length: 2000 meters | Optical splitter C Terminal box model: HW2802 Serial number: SN_FAT02 | 1 | Connected to the port 1 SN_CABLE2002 Length: 50 meters | ONT C_1 |
| | | | | | | 2 | Connected to the port 2 SN_CABLE2003 Length: 150 meters | ONT C_2 |
| | | | | | | 3 | Empty | Empty |
| | | | | | | 4 | Empty | Empty |

There are two logical memories in the ODN topology management server. A memory 1 stores a physical topology, and a memory 2 stores a logical topology. For the logical topology 2 in the memory 2 in the ODN topology management server, the physical topology 1 in the database is used as an initial reference, performance data and alarm data of an OLT and an ONT are regularly collected, and features such as a steady state, a jitter, and a trend of an optical module are extracted for online monitoring. The key parameter information of the optical module is referred to as a KPI feature. KPI change mining is performed, mainly through group behavior similarity identification, on all ONTs connected to one port of an OLT, where similarity clustering of time sequence behavior in a window is mainly used. This can be used for topology discovery from a level-2 optical splitter to an ODN network at an ONT end. A period of time from a moment at which a fault occurs, a period in which the fault lasts, to a moment at which the fault is rectified is referred to as a time window. Based on different curves of receive optical power changes of different ONTs in the time window, the ONTs are classified into different types, and ONTs of a similar type are classified as ONTs that are connected to a same level-2 optical splitter.

Figure 15A:
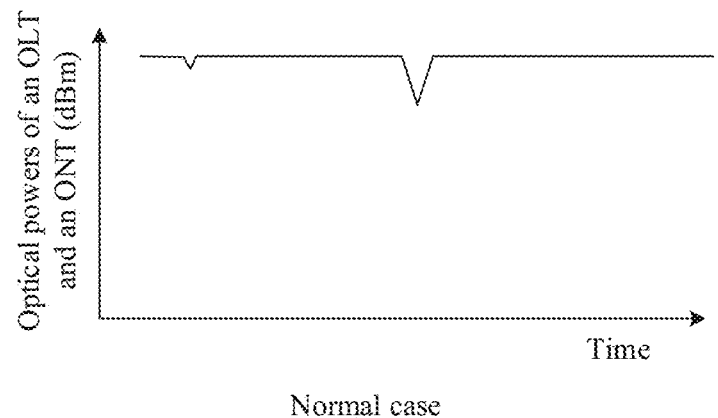
FIG. 15a is a schematic diagram of a curve of receive optical powers of an OLT and an ONT in a normal case according to an embodiment of this application.
Figure 15B:
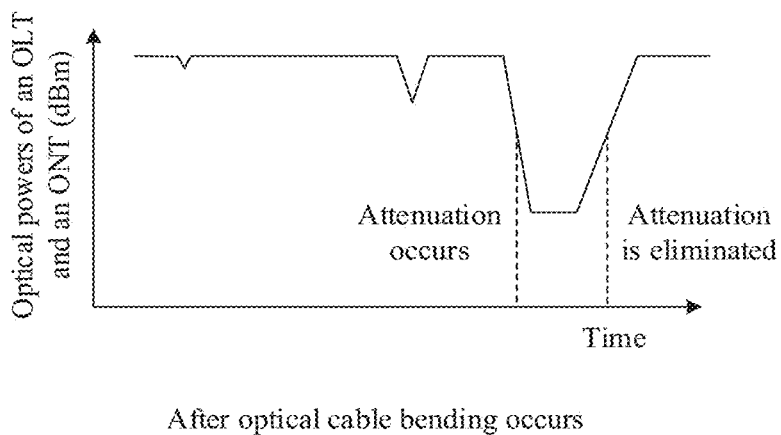
FIG. 15b is a schematic diagram of a curve of receive optical powers of an OLT and an ONT in a bending case according to an embodiment of this application.

FIG. 15a is a schematic diagram of a curve of receive optical powers of an OLT and an ONT in a normal case according to an embodiment of this application, and FIG. 15b is a schematic diagram of a curve of receive optical powers of an OLT and an ONT in a bending case of an optical cable according to an embodiment of this application. The receive optical power of the ONT is relatively stable in the normal case. However, when a segment of an optical cable is faulty over a link from the OLT to the ONT, the receive optical power of the ONT reduces in a fault period. After the fault is rectified, the receive optical power of the ONT recovers. Herein, a principle is described only by using an example of monitoring the receive optical power of the ONT, and other parameters may also be monitored. Details are not described one by one herein.

The logical topology 2 in the memory 2 in the ODN topology management server regularly collects receive optical powers of all ONTs on an ODN network connected to an OLT 01, where the ONTs include an ONT B_1, an ONT C_1, an ONT C_2. A KPI feature change is used as a feature, and similarity clustering of time sequence behavior within a window is performed. This can be used for topology discovery from a level-2 optical splitter to an ODN network at an ONT end.

Figure 15C:
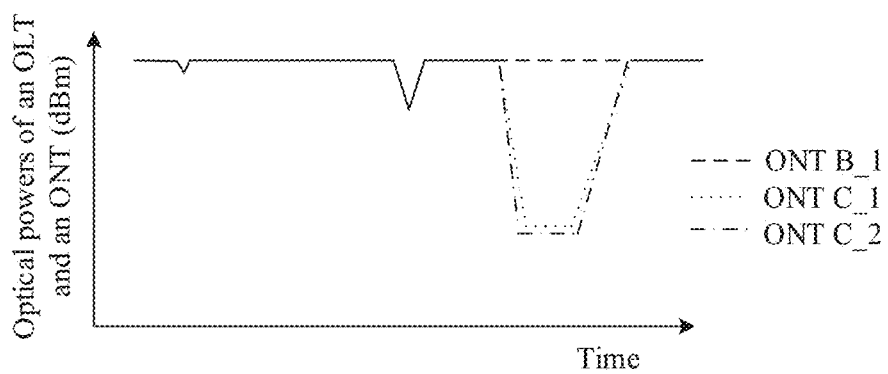
FIG. 15c is a schematic diagram of curves of receive optical powers, of all ONTs connected to an OLT, obtained when a first bending fault occurs according to an embodiment of this application.

When a bending fault occurs on an optical cable between a level-1 optical splitter A and a level-2 optical splitter C for the first time, FIG. 15c is a schematic diagram of curves of receive optical powers of all ONTs connected to an OLT when a bending fault occurs for the first time according to an embodiment of this application. Receive optical powers of the ONT C_1 and the ONT C_2 are reduced almost at the same time when the fault occurs. Both the ONT C_1 and the ONT C_2 operate at relatively low receive optical powers during a period when the fault is not rectified. By comparison, because an ODN link between the OLT and the ONT B_1 is not faulty, a receive optical power of the ONT B_1 does not change during this period of time. After the fault is rectified, the ONT C_1 and ONT C_2 both are recovered to previously normal receive optical powers. Based on analysis of similar ONT indicators, it can be learned that the ONT C_1 and ONT C_2 are located in a network of a same level-2 optical splitter while the ONT B_1 is located in a different level-2 optical splitter.

The ODN topology management server may collect and analyze a change of the ONT status information, and generate a logical topology structure 2. The ODN topology management server regularly compares a difference between a topology result 2 and a topology result 1 that is used as a reference. If a determining result is that the topology result 2 is consistent with the topology result 1, it is determined that current topology data of the ODN network is accurate, without requiring calibration.

The logical topology 2 in the memory 2 in the ODN topology management server regularly collects receive optical powers of all ONTs on the ODN network connected to the OLT 01.

Figure 15D:
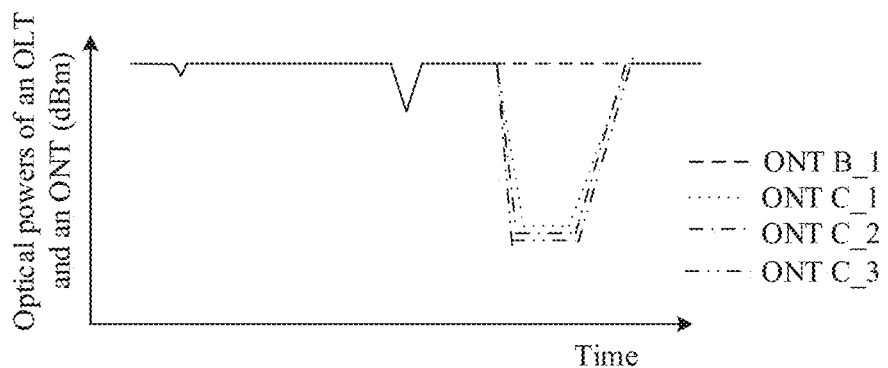
FIG. 15d is a schematic diagram of curves of receive optical powers, of all ONTs connected to an OLT, obtained when a bending fault occurs for a second time according to an embodiment of this application.

At a time point, when a bending fault occurs on the optical cable between a level-1 optical splitter A and a level-2 optical splitter C for a second time, FIG. 15d is a schematic diagram of curves of receive optical powers of all ONTs connected to an OLT when the bending fault occurs for the second time according to an embodiment of this application. Received optical powers of an ONT C_1, an ONT C_2, and an ONT C_3 are reduced almost at the same time when the fault occurs. The ONT C_1, the ONT C_2, and the ONT C_3 all operate at relatively low receive optical powers during a period when the fault is not rectified. By comparison, because an ODN link between the OLT and the ONT B_1 is not faulty, a receive optical power of the ONT B_1 does not change during this period of time. After the fault is rectified, the ONT C_1, the ONT C_2, and the ONT C_3 all are recovered to previously normal receive optical powers. Based on analysis of similar ONT indicators, it can be learned that the ONT C_1, the ONT C_2, and the ONT C_3 are located in a network of a same level-2 optical splitter while the ONT B_1 is located in a different level-2 optical splitter.

The ODN topology management server generates an ODN logical topology structure 2, and the ODN topology management server regularly compares a difference between a topology result 2 and a topology result 1 that is used as a reference, and in this case, the determining result is that the topology result 2 is consistent with the topology result 1. Because in a physical topology 1 used as a reference, an optical splitter B is connected only to two ONTs: the ONT C_1 and the ONT C_2. However, in a current logical topology 2 obtained through cluster analysis, the optical splitter B is connected to three ONTs: the ONT C_1, the ONT C_2, and ONT C_3. Therefore, it is determined that current topology data of the ODN network may be incorrect, and prewarning is sent. The error may be caused by, including but not limited to, the following reasons: an onsite abnormal operation, a changed physical topology 1 is not updated in a database because a change is not uploaded to the database due to lacking maintenance recording, or the correct logical topology 2 generated through cluster analysis is incorrect After the pre-warning is sent, the ODN topology management server generates a work order used for driving onsite troubleshooting for the physical topology 1. After receiving the work order, a construction engineer goes to the site of the optical splitter B to conduct a survey, to find that a port 3 of the optical splitter B is connected to a new optical cable and a new user. However, the construction engineer forgets to report the information, and consequently the physical topology 1 is not updated in the ODN topology management server.

Figure 16:
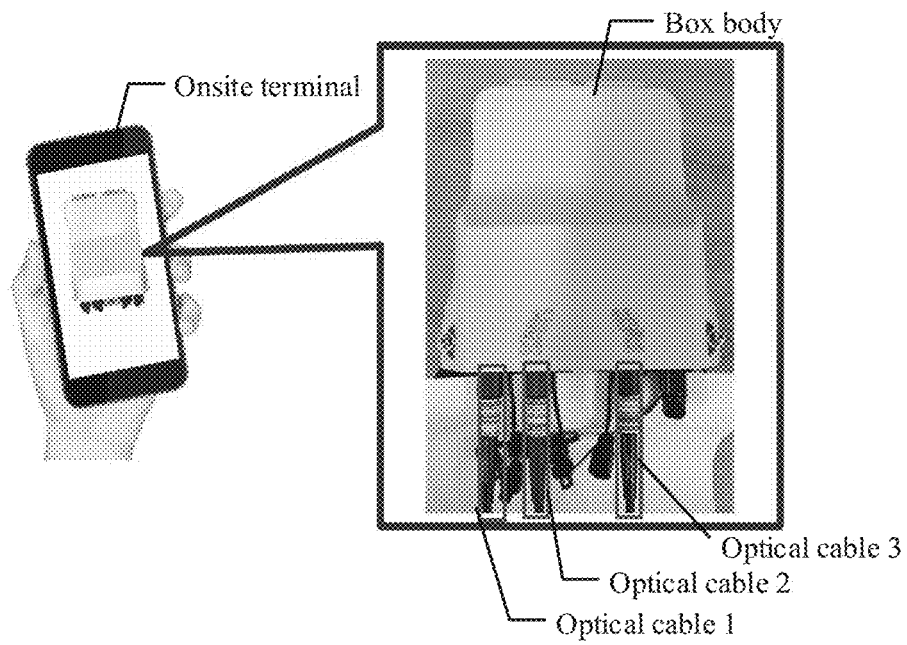
FIG. 16 is a schematic diagram of collecting images of an ODN device, an optical cable 1, an optical cable 2, and an optical cable 3 by an onsite terminal according to an embodiment of this application.

The construction engineer collects, on the site by using an image collection apparatus, photos or videos of components such as a terminal box and an optical cable, and photos or videos of barcodes on the terminal box and the optical cable. FIG. 16 is a schematic diagram of collecting images of an ODN device, an optical cable 1, an optical cable 2, and an optical cable 3 by an onsite terminal according to an embodiment of this application. A physical connection relationship between the terminal box and the optical cable is established through photographing at an optical splitter C.

Figure 17:
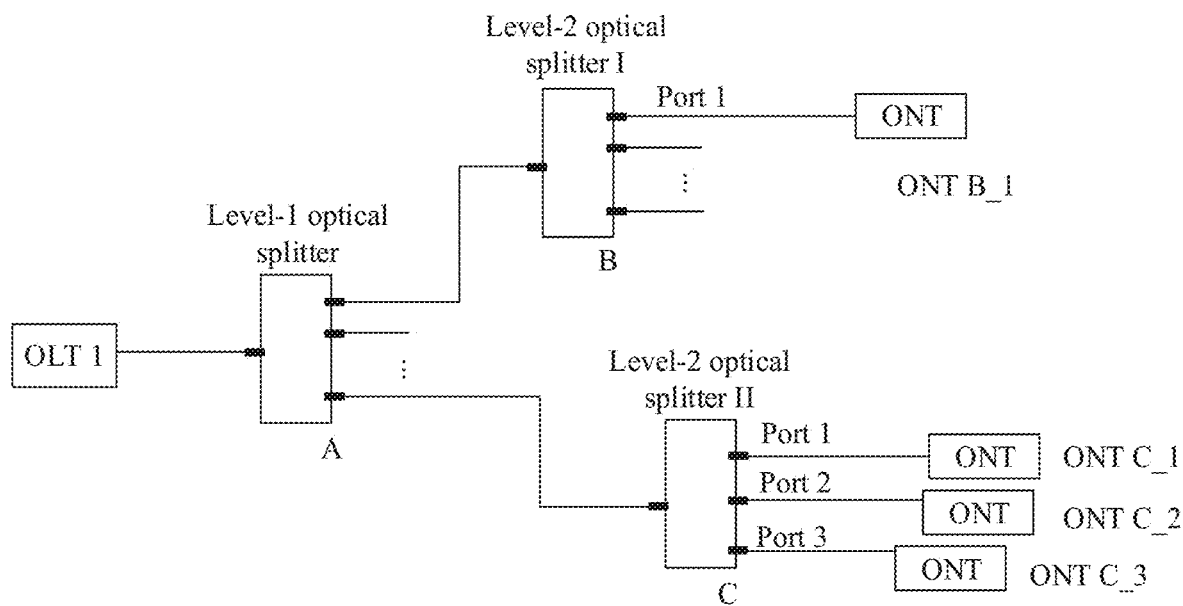
FIG. 17 is a schematic diagram of a system architecture updated based on the optical communications network shown in FIG. 14 according to an embodiment of this application.

An ODN topology management server or an onsite intelligent terminal intelligently generates a connection relationship that is at a position of the optical splitter C and that is a part of a physical topology 1. The connection relationship may be used for identifying that a terminal box model is HW2802, that a serial number is SN_FAT02, that the optical splitter C has been installed inside, and that there are four ports in total. The newly installed port 3 is connected to an optical cable, with a serial number SN_CABLE2004 of the optical cable and a length of 100 meters. The other end of the optical cable is connected to the ONT C_3 at the home of a terminal user, and a connection relationship between the optical cable and the ONT C_3 is recorded. An onsite-determined connection relationship between the level-2 optical splitter C, the optical cable, and the ONT C_3 is used as a reference to refresh a physical topology from the optical splitter C to an ONT. As shown in Table 4, the physical topology 1 of the ODN network is refreshed synchronously (shown in Table 5) and is stored in the database of the server. A connection relationship corresponding to the current ODN physical topology 1 is shown in FIG. 17. FIG. 17 is a schematic diagram of a system architecture obtained through update based on the optical communications network shown in FIG. 14 according to an embodiment of this application. The ODN topology management server uses the refreshed physical topology 1 as a reference, and records the refreshed physical topology 1 in the database.

Table 4 shows a partial physical topology 1 from the level-2 optical splitter C to an ONT provided in this embodiment of this application.

| Level-2 optical splitter | Port number | Optical cable | ONT |
| --- | --- | --- | --- |
| Optical splitter C Terminal box model: HW2802 Serial number: SN_FAT02 | 1 | Connected to the port 1 SN_CABLE2002 Length: 50 meters | ONT C_1 |
| | 2 | Connected to the port 2 SN_CABLE2003 Length: 150 meters | ONT C_2 |
| | 3 | Connected to the port 3 SN_CABLE2004 Length: 100 meters | ONT C_3 |
| | 4 | Empty | Empty |

Table 5 shows a complete ODN physical topology 1 provided in this embodiment of this application.

sorted logical topology, thereby automatically sorting and reviewing resources in the optical fiber distribution network, and improving reliability of sorting resources in the optical fiber distribution network. In this way, resources on the optical network are sorted simply, quickly, automatically, and reliably, human resource investment is reduced, check efficiency is greatly improved, and check work of optical network resources is regularized.

Figure 18A:
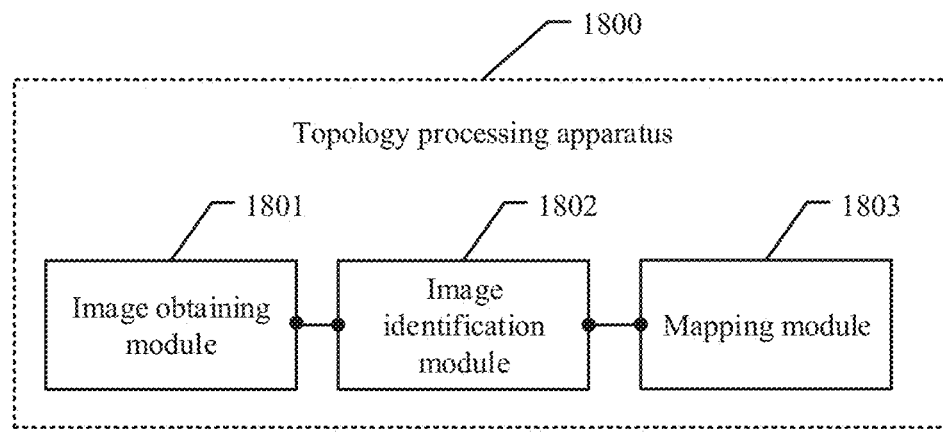
FIG. 18a is a schematic structural diagram of composition of a topology processing system according to an embodiment of this application.

The following first describes in detail a topology processing apparatus provided in an embodiment of this application. Referring to FIG. 18a, an embodiment of this application provides a topology processing apparatus 1800, including:

an image obtaining module 1801, configured to obtain a first onsite image collected from an optical distribution network ODN, where the first onsite image includes at least an imaging of a first port of a first ODN device, the first port is connected to a first cable, there is a first identification area used to identify the first cable on the first cable, and the first onsite image further includes at least an imaging of the first identification area on the first cable;

an image identification module 1802, configured to identify the first cable based on the first identification area on the first onsite image, and identify, based on the first onsite image, the first port connected to the first cable; and a mapping module 1803, configured to generate a first correspondence between the first ODN device, the first port, and the first cable.

In some embodiments of this application, there is a device identification area on the first ODN device, the device identification area is used to identify the first ODN device, and the first onsite image further includes an imaging of the device identification area; and the image identification module 1802 is further configured to identify the first ODN device based on the device identification area on the first onsite image.

In some embodiments of this application, the device identification area is used to indicate at least one of the following information: an identifier of the first ODN device, a port arrangement manner of the first ODN device, a type

| OLT | Optical cable | Level-1 optical splitter | Port number | Optical cable | Level-2 optical splitter | Port number | Optical cable | ONT |
| --- | --- | --- | --- | --- | --- | --- | --- | --- |
| OLT 01 | SN_CABLE01 | Optical splitter A Terminal box model: HW2801 Serial number: SN_00 | 1 | SN_CABLE1001 Length: 1000 meters | Optical splitter B Terminal box model: HW2802 Serial number: SN_FAT01 | 1 | Connected to the port 1 SN_CABLE2001 Length: 100 meters | ONT B_1 |
| | | | | | | 2 | Empty | Empty |
| | | | | | | 3 | Empty | Empty |
| | | | | | | 4 | Empty | Empty |
| | | | 2 | Length of SN_CABLE1002: 2000 meters | Optical splitter C Terminal box model: HW2802 Serial number: SN_FAT02 | 1 | Connected to the port 1 SN_CABLE2002 Length: 50 meters | ONT C_1 |
| | | | | | | 2 | Connected to the port 1 SN_CABLE2003 Length: 150 meters | ONT C_2 |
| | | | | | | 3 | SN_CABLE2004 Length: 100 meters | ONT C_3 |
| | | | | | | 4 | Empty | |

In this embodiment of this application, at a construction stage and a reconstruction stage, through image recognition, ODN resource management accuracy is improved, and problems that onsite manual recording and label printing are time-consuming and error-prone are resolved. This resolves a problem of low ODN resource management accuracy in a related technology in addition to improving construction efficiency. Subsequently, the ODN topology server automatically matches, sorts, and reviews a change of a to-beof the first ODN device, a serial number of the first ODN device, or a production date of the first ODN device.

In some embodiments of this application, the image obtaining module 1801 is further configured to obtain a second onsite image, where the second onsite image includes at least an imaging of a second port of a first optical network terminal ONT, and the second port is connected to the first cable;

the image identification module 1802 is further configured to identify, based on the second onsite image, the second port connected to the first cable; and the mapping module 1803 is further configured to generate a second correspondence between a first ONT, the second port, and the first cable.

Figure 18B:
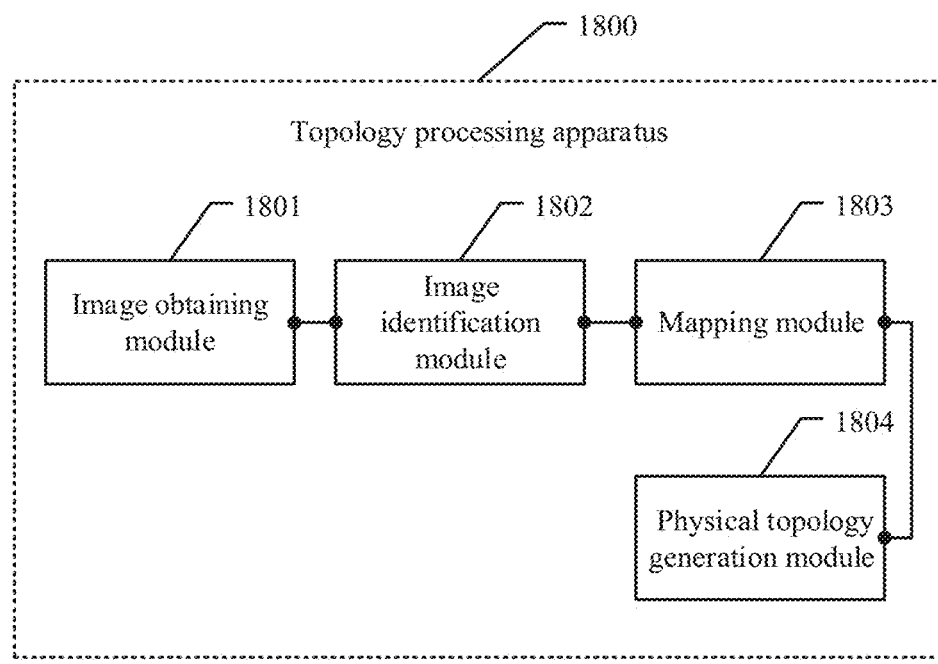
FIG. 18b is a schematic structural diagram of composition of another topology processing system according to an embodiment of this application.

In some embodiments of this application, as shown in FIG. 18*b*, the topology processing apparatus 1800 further includes:

a physical topology generation module 1804, configured to generate a first physical topology based on the first correspondence and the second correspondence.

Figure 18C:
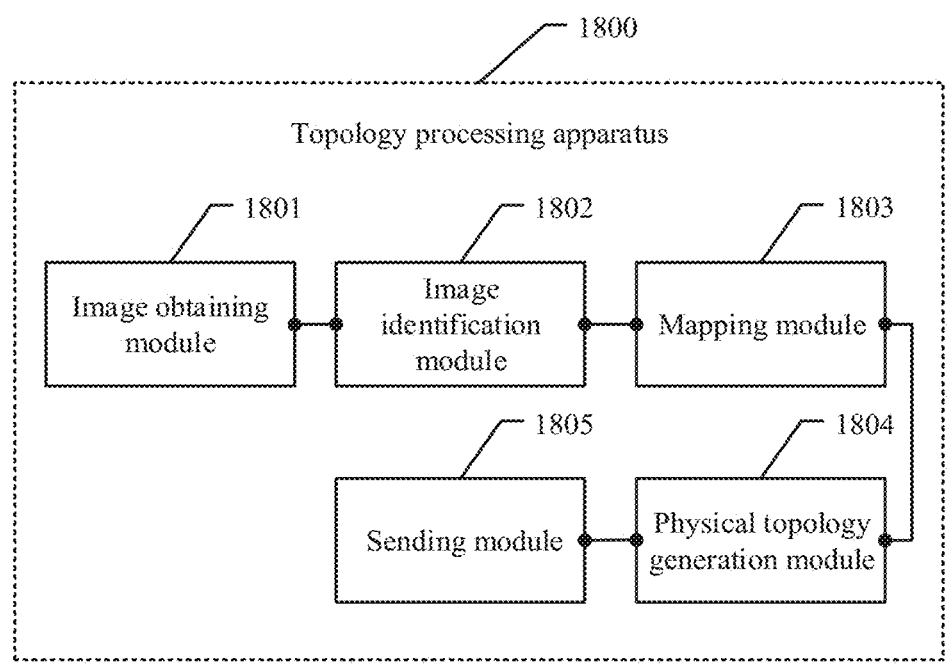
FIG. 18c is a schematic structural diagram of composition of another topology processing system according to an embodiment of this application.

In some embodiments of this application, as shown in FIG. 18*c*, the topology processing apparatus 1800 is an onsite terminal, and the topology processing apparatus 1800 further includes:

a sending module 1805, configured to send the first physical topology to a network management server.

In some embodiments of this application, the topology processing apparatus 1800 is a network management server, and the image obtaining module 1801 is configured to receive the first onsite image sent by an onsite terminal, where the first onsite image is obtained by the onsite terminal by collecting an onsite image of the ODN.

In some embodiments of this application, as shown in FIG. 18*c*, the topology processing apparatus 1800 is an onsite terminal, and the topology processing apparatus 1800 further includes:

a sending module 1805, configured to send the first correspondence to a network management server.

Figure 18D:
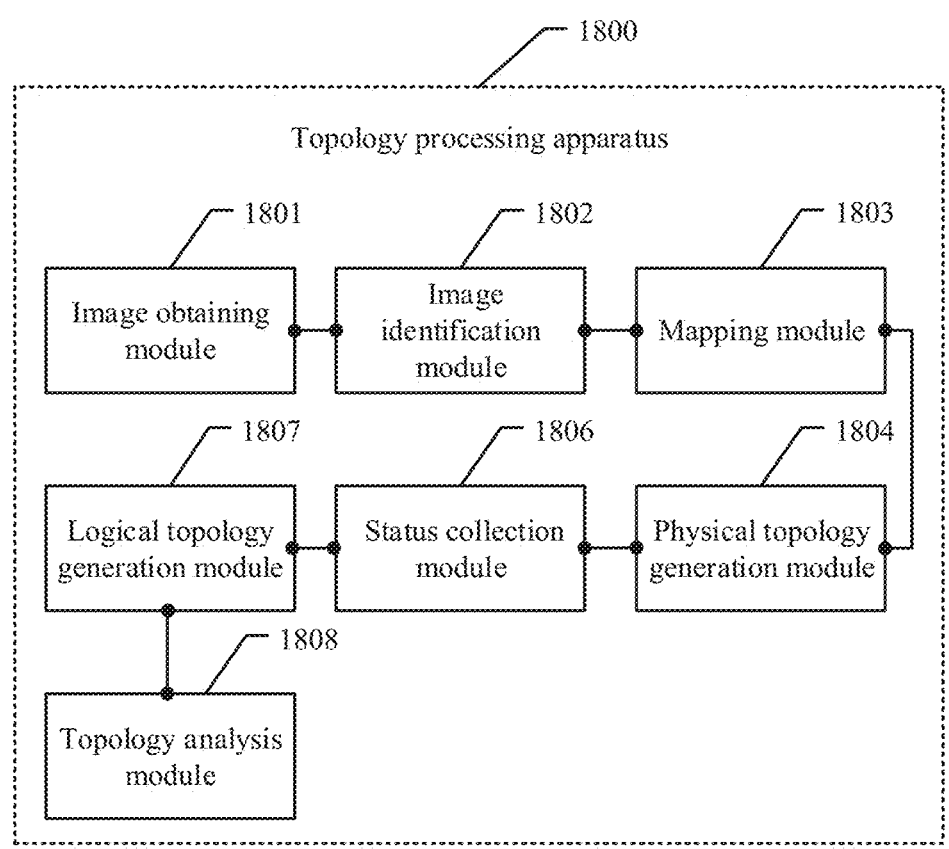
FIG. 18d is a schematic structural diagram of composition of another topology processing system according to an embodiment of this application.

In some embodiments of this application, as shown in FIG. 18*d*, the topology processing apparatus 1800 is a network management server, and the topology processing apparatus 1800 further includes:

a status collection module 1806, configured to periodically collect first status information of the first ONT from the first physical topology;

a logical topology generation module 1807, configured to perform status change analysis on the first status information by using a preconfigured logical topology generation algorithm, and generate a first logical topology based on a status change analysis result, where the first logical topology includes a correspondence between the first ODN device, the first cable, and the first ONT; and a topology analysis module 1808, configured to perform comparison analysis between the first physical topology and the first logical topology, and determine, based on a comparison analysis result, whether the first physical topology needs to be updated.

As shown in FIG. 3, an embodiment of this application provides a topology processing system. The topology processing system includes an onsite terminal and a network management server.

The onsite terminal is configured to obtain a first onsite image collected from an optical distribution network ODN, where the first onsite image includes at least an imaging of a first port of a first ODN device, the first port is connected to a first cable, there is a first identification area used to identify the first cable on the first cable, and the first onsite image further includes at least an imaging of the first identification area on the first cable.

The onsite terminal is further configured to send the first onsite image to the network management server.

The network management server is configured to receive the first onsite image; identify the first cable based on the first identification area on the first onsite image, and identify, based on the first onsite image, the first port connected to the first cable; and generate a first correspondence between the first ODN device, the first port, and the first cable.

As shown in FIG. 3, an embodiment of this application provides a topology processing system. The topology processing system includes an onsite terminal and a network management server.

The onsite terminal is configured to obtain a first onsite image collected from an optical distribution network ODN, where the first onsite image includes at least an imaging of a first port of a first ODN device, the first port is connected to a first cable, there is a first identification area used to identify the first cable on the first cable, and the first onsite image further includes at least an imaging of the first identification area on the first cable; identify the first cable based on the first identification area on the first onsite image, and identify, based on the first onsite image, the first port connected to the first cable; and generate a first correspondence between the first ODN device, the first port, and the first cable.

The onsite terminal is further configured to send the first correspondence to the network management server.

The network management server is configured to receive the first correspondence; and determine, based on the first correspondence, that the first ODN device, the first port, and the first cable are corresponding to each other.

It should be noted that, for brief description, the foregoing method performed by the topology processing apparatus is described as a series of actions. However, a person skilled in the art should know that this application is not limited to the described order of the actions, because according to this application, some steps may be performed in another order or performed simultaneously. In addition, it should be further appreciated by a person skilled in the art that the embodiments described in this specification all are embodiments, and the actions and modules are not necessarily required by this application.

Because content such as information exchange between and an execution process of modules/units of the foregoing apparatus belongs to a same idea as the method embodiments of this application, the content brings same technical effects as the method embodiments of this application. For specific content, refer to the descriptions in the method embodiments of this application described above. This is not further described herein again.

An embodiment of this application further provides a computer storage medium. The computer storage medium stores a program, and the program is used to perform some or all of the steps described in the foregoing method embodiments.

Figure 19:
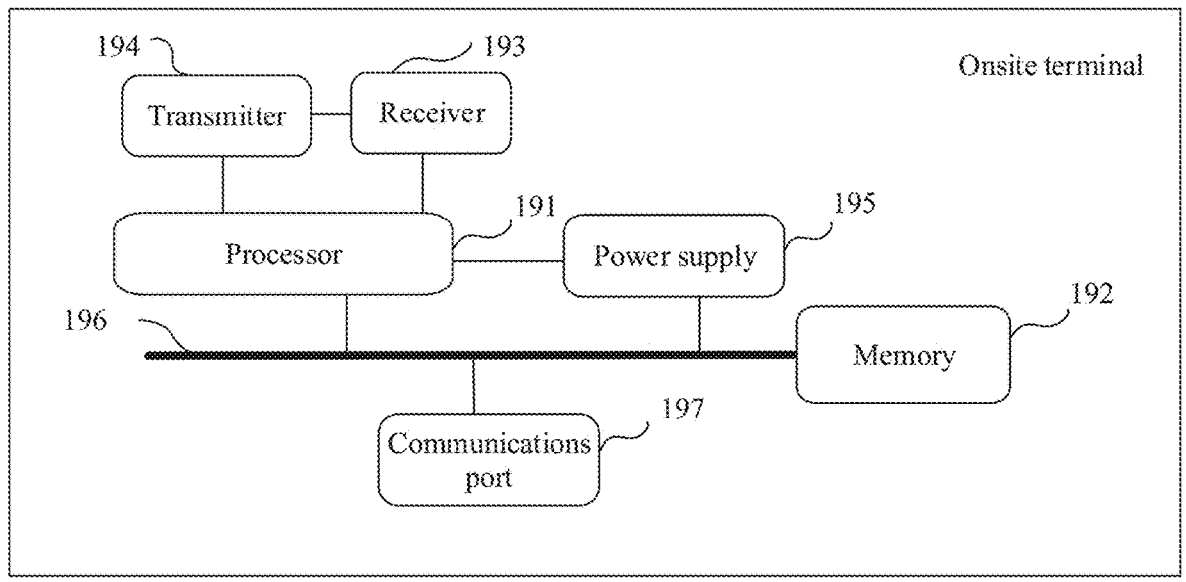
FIG. 19 is a schematic structural diagram of composition of an onsite terminal according to an embodiment of this application.

FIG. 19 is a schematic structural diagram of still another topology processing apparatus according to an embodiment of this application. The topology processing apparatus is an onsite terminal, and the onsite terminal may include a processor 191 (for example, a CPU), a memory 192, a transmitter 194, and a receiver 193. The transmitter 194 and the receiver 193 are coupled to the processor 191, and the processor 191 controls a sending action of the transmitter 194 and a receiving action of the receiver 193. The memory 192 may include a high-speed RAM memory, or may further include a non-volatile memory NVM, for example, at least one magnetic disk memory. The memory 192 may store various instructions, to implement various processing functions and implement method steps of this embodiment of this application. Optionally, the onsite terminal in this embodiment of this application may further include one or more of a power supply 195, a communications bus 196, and a communications port 197. The receiver 193 and the transmitter 194 may be integrated into a transceiver of the onsite terminal, or may be a receive antenna and a transmit antenna that are independent of each other on the onsite terminal. The communications bus 196 is configured to implement a communication connection between elements. The communications port 197 is configured to implement a connection and communication between the onsite terminal and another peripheral. The onsite terminal in this embodiment of this application may further include a camera 198, and the camera 198 is configured to take onsite photos of devices such as an ODN device, a cable, an ONT, and an OLT. For details, refer to the descriptions in the foregoing embodiment.

In this embodiment of this application, the memory 192 is configured to store computer-executable program code, where the program code includes an instruction. When the processor 191 executes the instruction, the processor 191 is enabled to execute a processing action of the onsite terminal in the foregoing method embodiments, and the transmitter 194 is enabled to execute a sending action of the onsite terminal in the foregoing method embodiments. Implementation principles and technical effects thereof are similar, and details are not described herein again.

Figure 20:
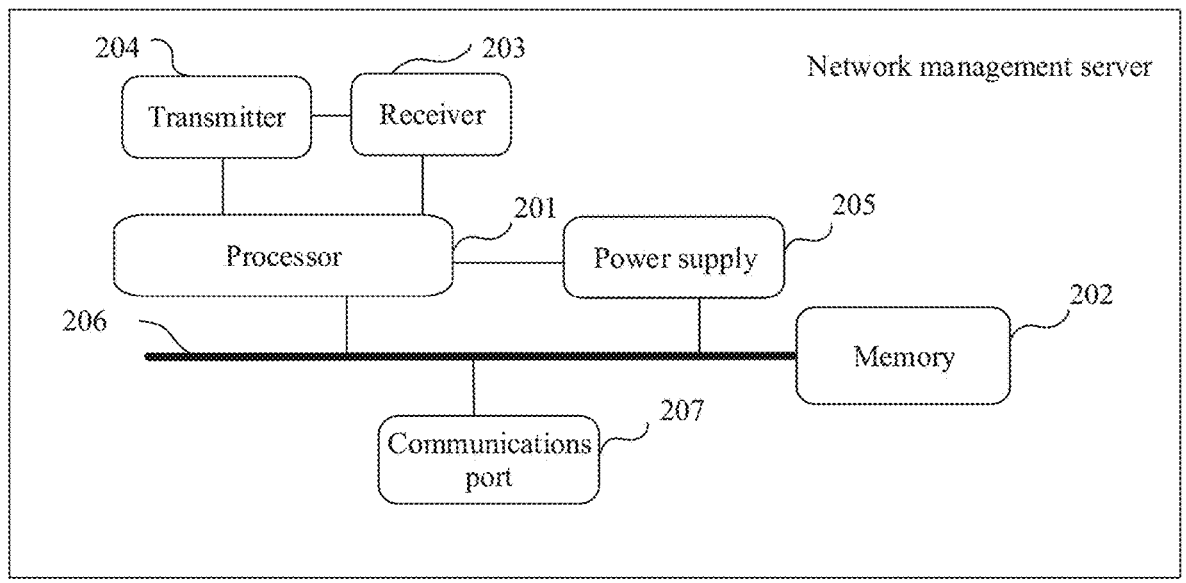
FIG. 20 is a schematic structural diagram of composition of a network management server according to an embodiment of this application.

FIG. 20 is a schematic structural diagram of still another topology processing apparatus according to an embodiment of this application. The topology processing apparatus is a network management server, and the network management server may include a processor (for example, a CPU) 201, a memory 202, a receiver 203, and a transmitter 204. The receiver 203 and the transmitter 204 are coupled to the processor 201, and the processor 201 controls a receiving action of the receiver 203 and a sending action of the transmitter 204. The memory 202 may include a high-speed RAM memory, or may further include a non-volatile memory NVM, for example, at least one magnetic disk memory. The memory 202 may store various instructions, to implement various processing functions and implement method steps of this embodiment of this application. Optionally, the network management server in this embodiment of this application may further include one or more of a power supply 205, a communications bus 206, and a communications port 207. The receiver 203 and the transmitter 204 may be integrated into a transceiver of the network management server, or may be a receive antenna and a transmit antenna that are independent of each other on the network management server. The communications bus 206 is configured to implement a communication connection between elements. The communications port 207 is configured to implement a communication connection between the network management server and another peripheral.

In this embodiment of this application, the memory 202 is configured to store computer-executable program code, where the program code includes an instruction. When the processor 201 executes the instruction, the instruction enables the processor 201 to execute a processing action of the onsite terminal in the foregoing method embodiments, and enables the transmitter 204 to execute a sending action of the network management server in the foregoing method embodiments. Implementation principles and technical effects thereof are similar, and details are not described herein again.

In another possible design, when the topology processing apparatus is a chip in the onsite terminal or in the network management server, the chip includes a processing unit and a communications unit. The processing unit may be, for example, a processor, and the communications unit may be, for example, an input/output interface, a pin, or a circuit. The processing unit may execute a computer-executable instruction stored in a storage unit, so that the chip in the terminal performs the topology processing method in any one of the first aspect and the possible implementations. Optionally, the storage unit is a storage unit inside the chip, for example, a register or a buffer. The storage unit may be alternatively a storage unit located outside the chip in the onsite terminal or the network management server, for example, a read-only memory (ROM), a static storage device of another type that can store static information and an instruction, or a random access memory (RAM).

The foregoing processor may be a general-purpose central processing unit (CPU), a microprocessor, an application-specific integrated circuit (ASIC), or one or more integrated circuits for controlling program execution of the wireless communication method in the first aspect.

In addition, it should be noted that the apparatus embodiments described above are merely examples. The units described as separate parts may or may not be physically separate, and parts displayed as units may or may not be physical units, may be located in one position, or may be distributed on a plurality of network units. Some or all of the modules may be selected based on an actual requirement to achieve the objectives of the solutions of the embodiments. In addition, in the accompanying drawings of the apparatus embodiments provided in this application, connection relationships between modules indicate that the modules have communication connections with each other, which may be specifically implemented as one or more communications buses or signal cables. A person of ordinary skill in the art may understand and implement the embodiments without creative efforts.

Based on the descriptions of the foregoing implementations, a person skilled in the art may clearly understand that this application may be implemented by using software in addition to necessary universal hardware, or by dedicated hardware including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be of various forms, for example, in a form of an analog circuit, a digital circuit, a dedicated circuit, or the like. However, as for this application, a software program implementation is a better implementation in most cases. Based on such an understanding, the technical solutions of this application essentially or the part contributing to the prior art may be implemented in a form of a software product. The computer software product is stored in a readable storage medium, such as a floppy disk, a USB flash drive, a removable hard disk, a read-only memory (ROM), a random access memory (RAM), a magnetic disk, or an optical disc of a computer, and includes several instructions for instructing a computer device (which may be a personal computer, a server, a network device, or the like) to perform the methods described in the embodiments of this application.

All or some of the foregoing embodiments may be implemented by using software, hardware, firmware, or any combination thereof. When being implemented by using the software, all or some of the embodiments may be implemented in a form of a computer program product.

The computer program product includes one or more computer instructions. When the computer program instructions are loaded and executed on a computer, some or all of the procedures or functions according to the embodiments of this application are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

What is claimed is:

1. A topology processing method, comprising:
obtaining, by a topology processing apparatus, a first onsite image collected from an optical distribution network (ODN), wherein the first onsite image comprises at least an imaging of a first port of a first ODN device, the first port is connected to a first cable, a first identification area that identifies the first cable is disposed on the first cable, and the first onsite image further comprises at least an imaging of the first identification area on the first cable;
identifying, by the topology processing apparatus, the first cable based on the first identification area on the first onsite image, and identifying, based on the first onsite image, the first port connected to the first cable;
generating, by the topology processing apparatus, a first correspondence between the first ODN device, the first port, and the first cable;
obtaining, by the topology processing apparatus, a second onsite image, wherein the second onsite image comprises at least an imaging of a second port of a first optical network terminal (ONT), and the second port is connected to the first cable;
identifying, by the topology processing apparatus based on the second onsite image, the second port connected to the first cable; and
generating, by the topology processing apparatus, a second correspondence between the first ONT, the second port, and the first cable.

2. The method according to claim 1, wherein a device identification area is disposed on the first ODN device, the device identification area identifies the first ODN device, and the first onsite image further comprises an imaging of the device identification area; and the method further comprises:
identifying, by the topology processing apparatus, the first ODN device based on the device identification area on the first onsite image.

3. The method according to claim 2, wherein the device identification area indicates at least one of the following information: an identifier of the first ODN device, a port arrangement manner of the first ODN device, a type of the first ODN device, a serial number of the first ODN device, or a production date of the first ODN device.

4. The method according to claim 1, wherein the method further comprises:
generating, by the topology processing apparatus, a first physical topology based on the first correspondence and the second correspondence.

5. The method according to claim 4, wherein the topology processing apparatus is an onsite terminal, and the method further comprises:
sending, by the topology processing apparatus, the first physical topology to a network management server.

6. The method according to claim 4, wherein the topology processing apparatus is a network management server, and the method further comprises:
periodically collecting, by the topology processing apparatus, first status information of the first ONT from the first physical topology; and
performing, by the topology processing apparatus, status change analysis on the first status information by using a preconfigured logical topology generation algorithm, and generating a first logical topology based on a status change analysis result, wherein the first logical topology comprises a correspondence between the first ODN device, the first cable, and the first ONT; and
performing, by the topology processing apparatus, comparison analysis between the first physical topology and the first logical topology, and determining, based on a comparison analysis result, whether the first physical topology needs to be updated.

7. The method according to claim 6, wherein the first status information comprises performance data of the first ONT or alarm data of the first ONT.

8. The method according to claim 6, wherein the performing, by the topology processing apparatus, status change analysis on the first status information by using a preconfigured logical topology generation algorithm comprises:
obtaining, by the topology processing apparatus based on the first status information, a status change feature that is of the first ONT in a first time period; and
performing, by the topology processing apparatus, similarity cluster analysis on the status change feature of the first ONT in the first time period.

9. The method according to claim 6, wherein the determining, based on a comparison analysis result, whether the first physical topology needs to be updated comprises:
when the comparison analysis result is that the first physical topology and the first logical topology have different correspondences, sending, by the topology processing apparatus, an onsite review instruction, and determining, based on an onsite review result, whether the first physical topology needs to be updated.

10. The method according to claim 1, wherein the topology processing apparatus is a network management server, and the obtaining, by the topology processing apparatus, a first onsite image collected from an optical distribution network (ODN) comprises:
receiving, by the topology processing apparatus, the first onsite image sent by an onsite terminal, wherein the first onsite image is obtained by the onsite terminal by collecting an onsite image of the ODN.

11. The method according to claim 1, wherein the topology processing apparatus is an onsite terminal, and the method further comprises:
sending, by the topology processing apparatus, the first correspondence to a network management server.

12. The method according to claim 1, wherein the method further comprises:
obtaining, by the topology processing apparatus, a third onsite image collected from the ODN, wherein the third onsite image comprises at least an imaging of a third port of a second ODN device, and the third port is connected to the first cable;

identifying, by the topology processing apparatus based on the third onsite image, the third port connected to the first cable; and generating, by the topology processing apparatus, a third correspondence between the second ODN device, the third port, and the first cable.

13. The method according to claim 1, wherein the first onsite image further comprises imagings of a plurality of ports of the first ODN device, and the identifying, based on the first onsite image, the first port connected to the first cable comprises:

identifying, by the topology processing apparatus, the first port based on a port arrangement manner observed by the plurality of ports and a relative position relationship between the first cable and a port.

14. The method according to claim 1, wherein the first ODN device comprises at least one of the following devices: a fiber access terminal, a splitting and splicing closure, an access terminal box, or an optical distribution frame.

15. A topology processing apparatus, wherein the topology processing apparatus comprises a processor and a memory, and the processor and the memory communicate with each other, wherein the memory is configured to store an instruction; and the processor is configured to execute the instruction in the memory, to perform:

obtaining a first onsite image collected from an optical distribution network LODN), wherein the first onsite image comprises at least an imaging of a first port of a first ODN device, the first port is connected to a first cable, a first identification area that identifies the first cable is disposed on the first cable, and the first onsite image further comprises at least an imaging of the first identification area on the first cable;

identifying the first cable based on the first identification area on the first onsite image, and identifying, based on the first onsite image, the first port connected to the first cable;

generating a first correspondence between the first ODN device, the first port, and the first cable;

obtaining a second onsite image, wherein the second onsite image comprises at least an imaging of a second port of a first optical network terminal ONT, and the second port is connected to the first cable;

identifying, based on the second onsite image, the second port connected to the first cable; and generating a second correspondence between the first ONT, the second port, and the first cable.

16. The topology processing apparatus according to claim 15, wherein the topology processing apparatus is an onsite terminal, and the topology processing apparatus further comprises a transmitter that is configured to send the first correspondence to a network management server.

17. The topology processing apparatus according to claim 15, wherein the processor is further configured to execute the instruction in the memory, to perform:

obtaining a third onsite image collected from the ODN, wherein the third onsite image comprises at least an imaging of a third port of a second ODN device, and the third port is connected to the first cable;

identifying, based on the third onsite image, the third port connected to the first cable; and generating a third correspondence between the second ODN device, the third port, and the first cable.

18. A non-transitory computer readable medium storing computer instructions, that when executed by one or more hardware processors, cause the one or more hardware processors to perform operations comprising:

obtaining a first onsite image collected from an optical distribution network (ODN), wherein the first onsite image comprises at least an imaging of a first port of a first ODN device, the first port is connected to a first cable, a first identification area that identifies the first cable is disposed on the first cable, and the first onsite image further comprises at least an imaging of the first identification area on the first cable;

identifying the first cable based on the first identification area on the first onsite image;

identifying, based on the first onsite image, the first port connected to the first cable; and generating a first correspondence between the first ODN device, the first port, and the first cable;

obtaining a second onsite image, wherein the second onsite image comprises at least an imaging of a second port of a first optical network terminal (ONT), and the second port is connected to the first cable;

identifying, based on the second onsite image, the second port connected to the first cable; and generating a second correspondence between the first ONT, the second port, and the first cable.

* * * * *

UNITED STATES PATENT AND TRADEMARK OFFICE
CERTIFICATE OF CORRECTION

PATENT NO. : 10,972,817 B2
APPLICATION NO. : 16/801529
DATED : April 6, 2021
INVENTOR(S) : Biao Qi et al.

Page 1 of 1

It is certified that error appears in the above-identified patent and that said Letters Patent is hereby corrected as shown below:

In the Claims

In Column 39, Line 31, in Claim 15, delete "LODN)," and insert -- (ODN), --, therefor.

In Column 40, Line 35, in Claim 18, after "cable;" delete "and".

Signed and Sealed this
First Day of June, 2021

Drew Hirshfeld
*Performing the Functions and Duties of the*
*Under Secretary of Commerce for Intellectual Property and*
*Director of the United States Patent and Trademark Office*